(12) United States Patent
Won et al.

(10) Patent No.: US 9,665,131 B2
(45) Date of Patent: May 30, 2017

(54) STORAGE MEDIUM, ELECTRONIC DEVICE AND METHOD FOR CONTROLLING ELECTRONIC DEVICE BASED ON USER DETECTION USING CAMERAS

(71) Applicant: Samsung Electronics Co., Ltd., Gyeonggi-do (KR)

(72) Inventors: Sung-Joon Won, Gyeonggi-do (KR); Hui-Chul Yang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 38 days.

(21) Appl. No.: 14/299,407

(22) Filed: Jun. 9, 2014

(65) Prior Publication Data

US 2014/0361986 A1  Dec. 11, 2014

(30) Foreign Application Priority Data

Jun. 7, 2013  (KR) .................. 10-2013-0065139

(51) Int. Cl.
| | |
|---|---|
| H04N 5/225 | (2006.01) |
| G06F 1/16 | (2006.01) |
| G06F 3/03 | (2006.01) |
| H04N 1/00 | (2006.01) |
| H04N 5/232 | (2006.01) |

(52) U.S. Cl.
CPC .......... *G06F 1/1686* (2013.01); *G06F 1/1694* (2013.01); *G06F 3/0304* (2013.01); *H04N 1/00307* (2013.01); *H04N 5/2258* (2013.01); *H04N 5/23219* (2013.01); *H04N 5/23222* (2013.01); *H04N 5/23293* (2013.01)

(58) Field of Classification Search
CPC .. G06F 1/1686; G06F 3/005; H04M 2250/52; H04N 5/232; H04N 5/23248; H04N 5/23264; H04N 5/772; H04N 5/2624; H04L 1/0061
USPC ......... 345/156; 348/222.1, 208.12, 252, 239, 348/211.11
See application file for complete search history.

(56) References Cited

U.S. PATENT DOCUMENTS

| | | | | |
|---|---|---|---|---|
| 8,451,344 | B1 * | 5/2013 | Karakotsios ........... | H04N 5/772 348/211.11 |
| 2008/0261660 | A1 * | 10/2008 | Huh ..................... | G06F 3/04815 455/566 |
| 2009/0082066 | A1 * | 3/2009 | Katz ..................... | G06F 1/3203 455/566 |
| 2011/0076003 | A1 * | 3/2011 | Cho ........................ | G03B 17/20 396/297 |
| 2011/0164515 | A1 * | 7/2011 | Park ....................... | H04L 1/0061 370/252 |

(Continued)

FOREIGN PATENT DOCUMENTS

CN   EP 2637471 A1 * 9/2013 ........... G06F 3/0486

*Primary Examiner* — Jennifer Mehmood
*Assistant Examiner* — James Nokham
(74) *Attorney, Agent, or Firm* — The Farrell Law Firm, P.C.

(57) ABSTRACT

An electronic device including a first camera and a second camera and method for controlling the electronic device are provided. The method includes detecting a user through the first camera; detecting the user through the second camera; and performing a preset function in the electronic device, based on a sequence of the detecting of the user through the first camera and the second camera.

18 Claims, 22 Drawing Sheets

(56) References Cited

U.S. PATENT DOCUMENTS

| | | | |
|---|---|---|---|
| 2012/0057039 A1* | 3/2012 | Gardiner | H04N 5/23219 348/222.1 |
| 2012/0086728 A1* | 4/2012 | McArdle | G06F 3/017 345/633 |
| 2013/0194172 A1* | 8/2013 | Shyamalan | G06F 3/012 345/156 |
| 2013/0235224 A1* | 9/2013 | Park | H04N 5/23222 348/218.1 |
| 2014/0139694 A1* | 5/2014 | Grandin | H04N 5/23248 348/208.12 |
| 2014/0184850 A1* | 7/2014 | Raju | H04N 5/2624 348/239 |

* cited by examiner

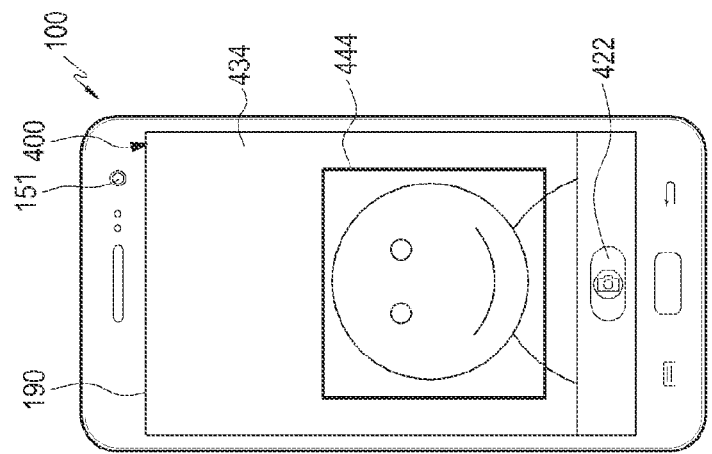
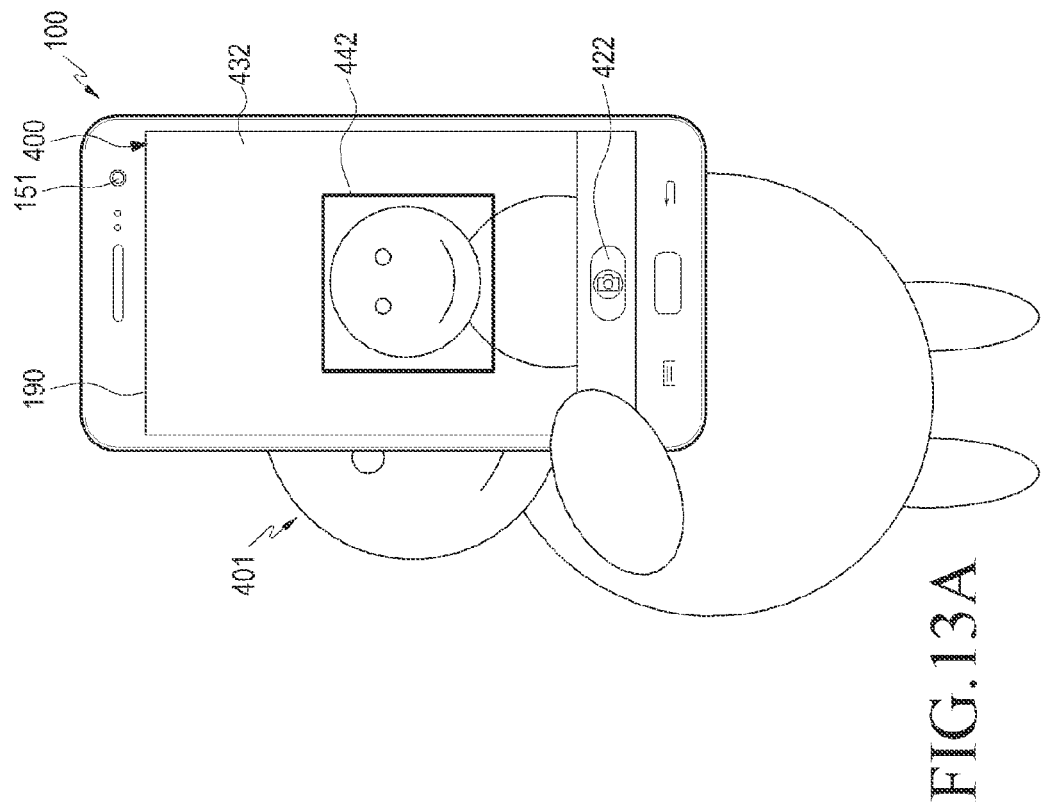
FIG.13B
FIG.13A

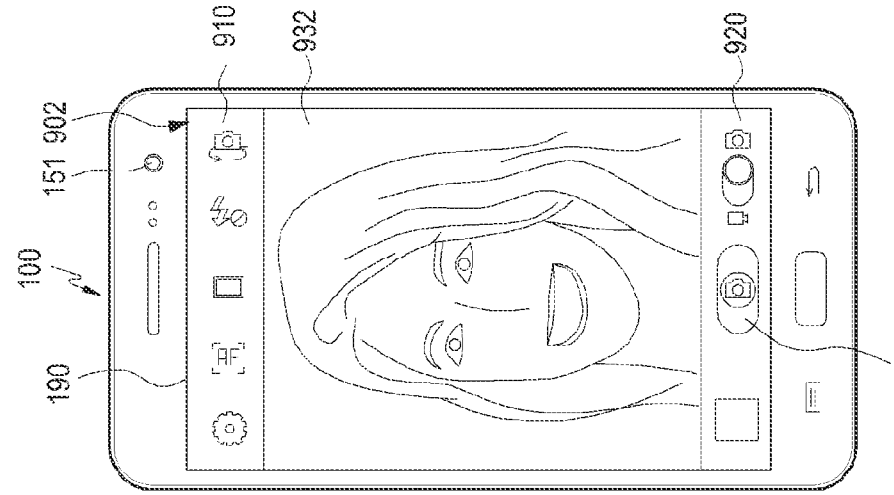
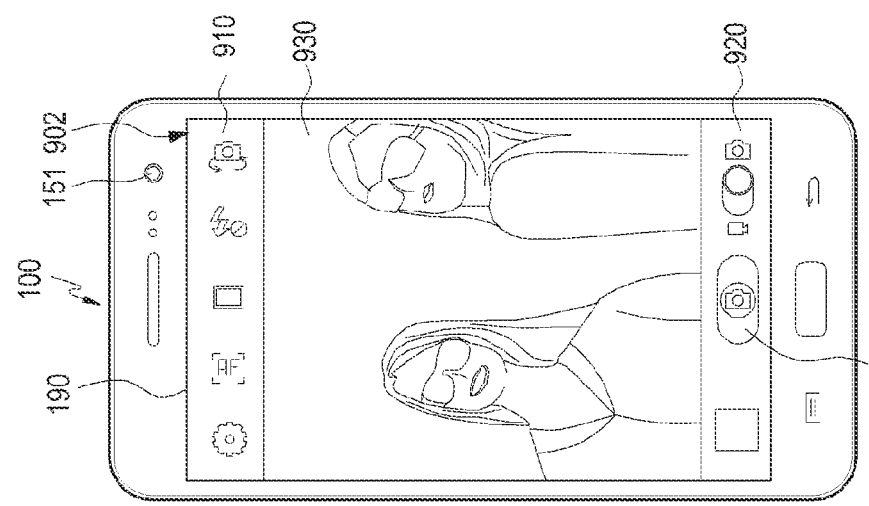
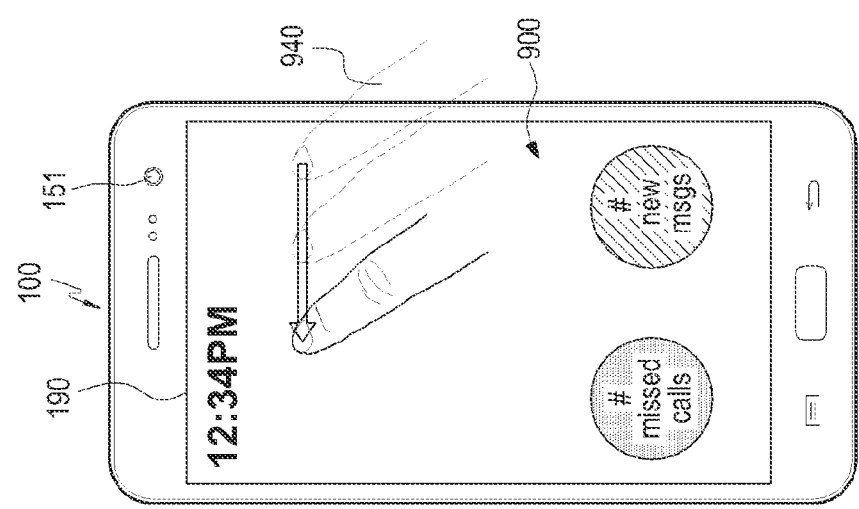

STORAGE MEDIUM, ELECTRONIC DEVICE AND METHOD FOR CONTROLLING ELECTRONIC DEVICE BASED ON USER DETECTION USING CAMERAS

PRIORITY

This application claims priority under 35 U.S.C. §119(a) to Korean Application Serial No. 10-2013-0065139, which was filed in the Korean Intellectual Property Office on Jun. 7, 2013, the entire content of which is hereby incorporated by reference.

BACKGROUND OF THE INVENTION

1. Field of the Invention

The present invention relates generally to an electronic device including a plurality of cameras, and more particularly, to an electronic device and a method for controlling the electronic device based on user image detection through the plurality of cameras.

2. Description of the Related Art

A cellular phone of the related art often includes both a front camera and a rear camera, where the rear camera usually has a larger number of pixels or a higher resolution relative to the front camera. Further, although the operation of the front camera or the rear camera is manually controllable by a user, the user may still find it difficult to manipulate a camera application for self-photographing through the higher resolution rear camera, because the user cannot check a screen of the cellular phone while facing the rear camera.

SUMMARY OF THE INVENTION

Accordingly, the present invention is designed to address at least the problems and/or disadvantages described above and to provide at least the advantages described below.

An aspect of the present invention is to provide an electronic device and a method for controlling the electronic device including a plurality of cameras, wherein a user can more conveniently and safely use a camera based application.

In accordance with an aspect of the present invention, a method for controlling an electronic device including a first camera and a second camera is provided. The method includes detecting a user through the first camera; detecting the user through the second camera; and performing a preset function in the electronic device, according to the detecting of the user through the first and the second cameras.

In accordance with another aspect of the present invention, a method for controlling an electronic device including a first camera and a second camera is provided. The method includes activating the first camera and the second camera; determining which of the first camera and the second camera a user is detected through; and performing a preset function in the electronic device, based on which of the first camera and the second camera the user is detected through.

In accordance with an aspect of the present invention, an electronic device is provided. The electronic device includes a first camera and a second camera that capture an image; a storage unit that stores the image captured by the first camera or the second camera; and a controller that detects a user through the first camera and the second cameras, and performs a preset function in the electronic device, according to a sequence of the detection of the user through the first camera and the second camera.

In accordance with an aspect of the present invention, an electronic device is provided. The electronic device includes a first camera and a second camera that capture an image; a storage unit that stores the image captured by the first camera or the second camera; and a controller that activates the first camera and the second camera, determines which of the first camera and the second camera a user is detected through, and performs a preset function in the electronic device, based on which of the first camera and the second camera the user is detected through.

BRIEF DESCRIPTION OF THE DRAWINGS

The above and other aspects, features, and advantages of certain embodiments of the present invention will be more apparent from the following detailed description taken in conjunction with the accompanying drawings, in which:

FIGS. 12A, 12B, 13A, and 13B illustrate examples of screen images displayed during an electronic device control method according to an embodiment of the present invention;

FIGS. 22A to 22C illustrate examples of screen images displayed during an electronic device control method according to an embodiment of the present invention.

DETAILED DESCRIPTION OF EMBODIMENTS OF THE PRESENT INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Herein, an electronic device may also be referred to as a portable terminal, a mobile terminal, a communication terminal, a portable communication terminal, portable mobile terminal, etc. Additionally, examples of the electronic device include a smart camera, a smart phone, a cell phone, a game machine, a television, a display device, a head unit for vehicles, a notebook computer, a laptop computer, a tablet computer, a Personal Media Player (PMP), a Personal Digital Assistants (PDA), etc. The electronic device may be realized as a pocket-sized portable communication terminal with a wireless communication function, which may be a flexible device or include a flexible display device.

Figure 1:
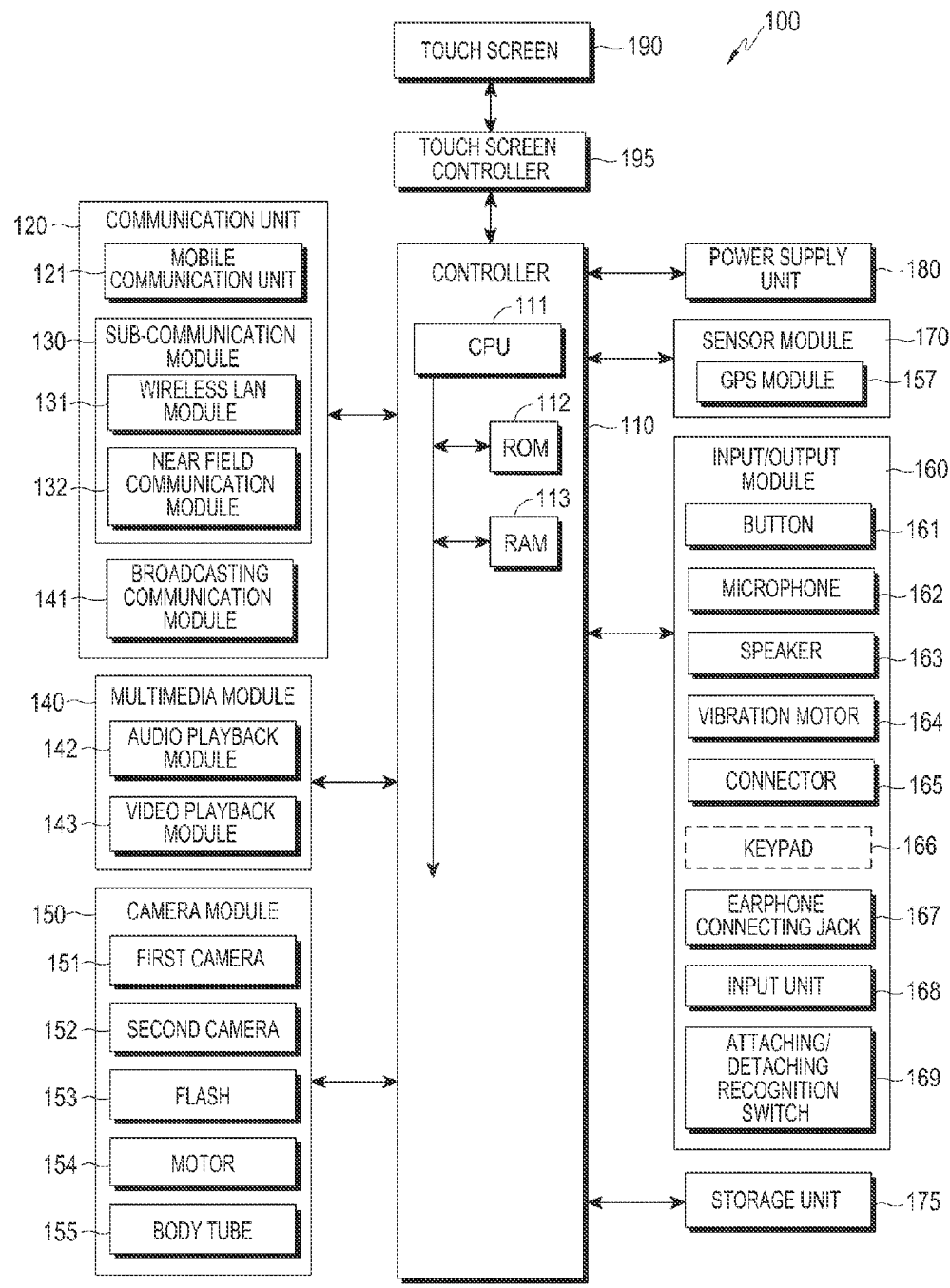
FIG. 1 illustrates an electronic device according to an embodiment of the present invention.

FIG. 1 is a schematic block diagram illustrating an electronic device according to an exemplary embodiment of the present invention. Specifically, FIG. 1 illustrates a representative configuration of the electronic device relating to a cell phone, in which some of the elements illustrated therein may be omitted or modified according to need in the representative configuration of the electronic device.

Referring to FIG. 1, the electronic device 100 includes a touch screen 190, a touch screen controller 195, a controller 110, the communication unit 120, a multimedia module 140, a camera module 150, an input/output module 160, a sensor module 170, a storage unit 175, and a power supply unit 180. The communication unit 120 includes a mobile communication module 121, a sub-communication module 130, and a broadcasting communication module 141. The sub-communication module 130 includes a wireless Local Area Network (LAN) module 131 and a near field communication module 132, and the multimedia module 140 includes an audio playback module 142 and a video playback module 143.

The controller 110 includes a Central Processing Unit (CPU) 111, a Read Only Memory (ROM) 112 in which control programs for control of the electronic device 100 are stored, and a Random Access Memory (RAM) 113 that stores signals or data input from the outside of the electronic device 100, or is used as a memory area for operations that are performed in the electronic device 100. The CPU 111, the ROM 112, and the RAM 113 may be connected with each other through an internal bus.

The controller 110 controls the overall operation of the electronic device 100, and controls other elements in the electronic device 100. More specifically, the controller 110 controls the communication unit 120, the multimedia module 140, the camera module 150, the input/output module 160, the sensor module 170, the storage unit 175, the power supply unit 180, the touch screen 190, and the touch screen controller 195. The controller 110 detects a user input and identifies an object corresponding to a location where the user input occurs on the touch screen, when a touchable user input unit, such as an input unit 168, and a user's finger touches any one of objects, is close to any one of the objects, or is located close to any one of the objects in a state that a plurality of objects or items are displayed on the touch screen 190. The user input through the touch screen 190 includes one of a direct touch input by which an object is directly touched, and a hovering input, i.e., an indirect touch input through which an object is accessed within a preset recognition distance, but is not actually touched.

In accordance with an embodiment of the present invention, the user input also includes a gesture input recognized through the camera module 150, a switch/button input through a button 161 or a keypad 166, and a voice input through a microphone 162.

The controller 110 performs a preset program operation corresponding to the user input event, when the user input event occurs for a preset item or according to a preset mode.

The controller 110 may output a control signal to the input unit 168 or a vibration motor 164.

The mobile communication module 121 connects the electronic device 100 with an external electronic device through mobile communication by using at least one antenna (not illustrated) under the control of the controller 110. The mobile communication module 121 transmits/receives wireless signals for a voice call, a video call, a Short Message Service (SMS), or a Multimedia Message Service (MMS).

The wireless LAN module 131 connects to a wireless Access Point (AP) (not illustrated), under the control of the controller 110. For example, the wireless LAN module 131 supports a wireless LAN protocol (IEEE802.11x) of the Institute of Electrical and Electronics Engineers (IEEE).

The Near Field Communication (NFC) module 132 performs near field communication in a wireless manner between the electronic device 100 and the external electronic device under the control of the controller 110. A communication method of the wireless LAN module 131 and the near field communication module 132 may include Bluetooth, Infrared Data Association (IrDA), Wi-Fi communication, Wi-Fi direct communication, Near Field Communication (NFC), etc.

A broadcasting communication module 141 receives a broadcasting signal (for example, a TV broadcasting signal, a radio broadcasting signal or a data broadcasting signal) and broadcasting additional information (for example, electronic program guide (EPG) or electronic service guide (ESG)), which are transmitted from a broadcasting station through a broadcasting communication antenna, under the control of the controller 110.

The audio play module 142 plays digital audio files (for example, files with an extension such as mp3, wma, ogg, and way) that are stored in the storage unit 175 or received, under the control of the controller 110. The video play module 143 plays stored or received digital video files (for example, files with an extension such as mpeg, mpg, mp4, avi, mov, and mkv) under the control of the controller 110.

Alternatively, the multimedia module 140 may be integrated into the controller 110.

The camera module 150 includes a first camera 151 and a second camera 152 that capture still or moving images under the control of the controller 110. Although FIG. 1 illustrates two cameras, i.e., the first camera 151 and the second camera 152, more than two cameras may be included in the electronic device 100.

Further, the camera module 150 includes a body tube 155 that performs zoom in/out for photography of a subject, a motor 154 that controls a movement of the body tube 155, and a flash 153 that provides a subsidiary light source necessary for photographing the subject. Herein, the first camera 151 is disposed on a front surface of the electronic device 100, and the second camera 152 is disposed on a rear surface of the electronic device 100. Accordingly, the first camera 151 may be referred to as a front camera, and the second camera 152 may be referred to as a rear camera.

The first and second cameras 151 and 152 may include a lens system and an image sensor, convert an optical signal that is input (or photographed) through the lens system into an electric image signal, and output the electric image signal to the controller 110. Accordingly, a user may photograph a moving image or a still image through the first and second cameras 151 and 152.

The input/output module 160 includes at least one button 161, a microphone 162, a speaker 163, the vibration motor 164, the connector 165, the keypad 166, the earphone connecting jack 167, and the input unit 168. The input/output module is not limited thereto, and cursor control such as a mouse, a track ball, a joystick, or cursor direction keys may be provided in order to control a movement of a cursor on the touch screen 190.

An attaching/detaching recognition switch 169 that operates in correspondence to mounting and detaching of the input unit 168 is installed at an area in the electronic device 100 into which the input unit 168 is inserted, and the attaching/detaching recognition switch 169 outputs a signal corresponding to the mounting and the detaching of the input unit 168 to the controller 110. The attaching/detaching recognition switch 169 may be configured to directly or indirectly contact the input unit 168 when the input unit 168 is mounted. Accordingly, the attaching/detaching recognition switch 169 generates a signal corresponding to the mounting or the detaching of the input unit 168 (namely, a signal notifying that the input unit 168 is mounted or detached) based on whether or not the input unit 168 is contacted, and outputs the signal to the controller 110.

The sensor module 170 includes a Global Positioning Satellite (GPS) module 157 that receives signals from a plurality of GPS satellites, and calculates a location of the electronic device 100 from the received signals. Additionally, although not illustrated, the sensor module 170 may include at least one of a proximity sensor that detects whether or not a user accesses the electronic device 100, an illumination sensor that detects a quantity of light around the electronic device 100, a motion sensor that detects motion of the electronic device 100 (for example, rotation, acceleration or vibration of the electronic device 100), a gyroscope that detects a rotary motion of the electronic device 100, an accelerometer that detects an accelerated motion of the electronic device 100, a geo-magnetic sensor that detects a point of a compass of the electronic device 100 by using the Earth's magnetic field, a gravity sensor detecting an action direction of gravity, and an altimeter detecting an altitude by measuring atmospheric pressure.

The storage unit 175 stores signals and/or data, which are input and output according to an operation of the communication unit 120, the multimedia module 140, the camera module 150, the input/output module 160, the sensor module 170 or the touch screen 190, under the control of the controller 110. Further, the storage unit 175 stores control programs for control of the electronic device 100 or the controller 110, or applications.

Herein, the term "storage unit" is used to refer to an arbitrary data storage device such as the storage unit 175, the ROM 112 in the controller 110, the RAM 113 or a memory card (for example, an SD card and a memory stick) that is mounted to the electronic device 100. The storage unit 175 may also include a non-volatile memory, a volatile memory, a Hard Disk Drive (HDD) or a Solid State Drive (SSD).

The storage unit 175 stores applications with various functions such as a navigation, a video call, a game, and a time based alarm application, images for the sake of providing a Graphic User Interface (GUI) related to the applications, user information, a document, databases or data related to a method of processing a touch input, background images (a menu screen and a standby screen) or operating programs necessary for driving the electronic device 100, and images photographed by the camera module 150.

In accordance with an embodiment of the present invention, the storage unit 175 stores a program or related data for executing a control method of an electronic device according to the present invention.

The storage unit 175 is a machine (for example, a computer) readable medium, and the terminology referred to as a machine readable medium may be defined as a medium that provides data to the machine such that the machine may perform a specific function. The storage unit 175 may include a non-volatile memory and a volatile memory. All such mediums are to be something tangible such that commands transferred through the mediums may be detected by a physical mechanism reading the commands into the machine.

The machine readable medium is not limited thereto, and includes at least one of a floppy disk, a flexible disk, a hard disk, a magnetic tape, a Compact Disc Read-Only Memory (CD-ROM), an optical disk, a punch card, a paper tape, a RAM, a Programmable Read-Only Memory (PROM), an Erasable PROM (EPROM), and a FLASH-EPROM.

The power supply unit 180 supplies electric power to one or a plurality of batteries disposed in the housing of the electronic device 100, under the control of the controller 110.

The touch screen 190 provides graphic user interfaces corresponding to various services (for example, telephone calls, data transmission, broadcasting, and photography) to the user, and outputs an analog signal corresponding to at least one user input that is input to the graphic user interfaces, to the touch screen controller 195.

For example, the touch screen 190 may receive the at least one user input through a user's body (for example, fingers including a thumb) or the input unit 168 (for example, a stylus pen or an electronic pen). Further, the touch screen 190 may receive a continuous movement of a touch (namely, a drag input) and outputs an analog signal corresponding to the continuous movement of the input touch to the touch screen controller 195.

Herein, the touch is not limited to the contact between the touch screen 190 and a finger or the input unit 168, and the touch may include non-contact, e.g., a hover input, as described above.

For example, the touch screen 190 may be realized through a resistive method, a capacitance method, an infrared method, an acoustic wave method, an Electro-Magnetic Resonance (EMR) method, or a combination of them.

The touch screen 190 may also include at least two touch screen panels that can detect a finger input and a pen input, respectively, to classify and detect an input by a first user input unit (a user's body part including a finger) and an input by a second user input unit (the input unit 168), that is, the pen input.

The touch screen controller 195 converts an analog signal input from the touch screen 190 into a digital signal, and transmits the digital signal to the controller 110. The controller 110 controls the touch screen 190 by using the digital signal received from the touch screen controller 195.

Further, the touch screen controller 195 may detect a pressure that is applied to the touch screen 190 by the user input unit, by detecting a value (for example, a current value) that is output through the touch screen 190, and converts the determined pressure value into a digital signal to provide the digital signal to the controller 110.

Figure 2:
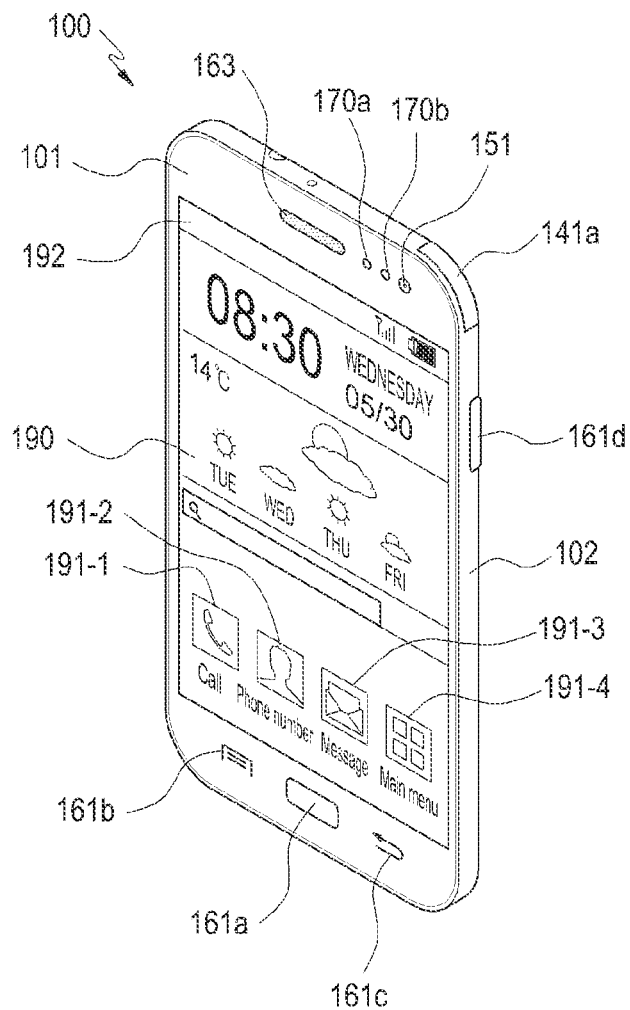
FIG. 2 is a front perspective view illustrating an electronic device according to an embodiment of the present invention.
Figure 3:
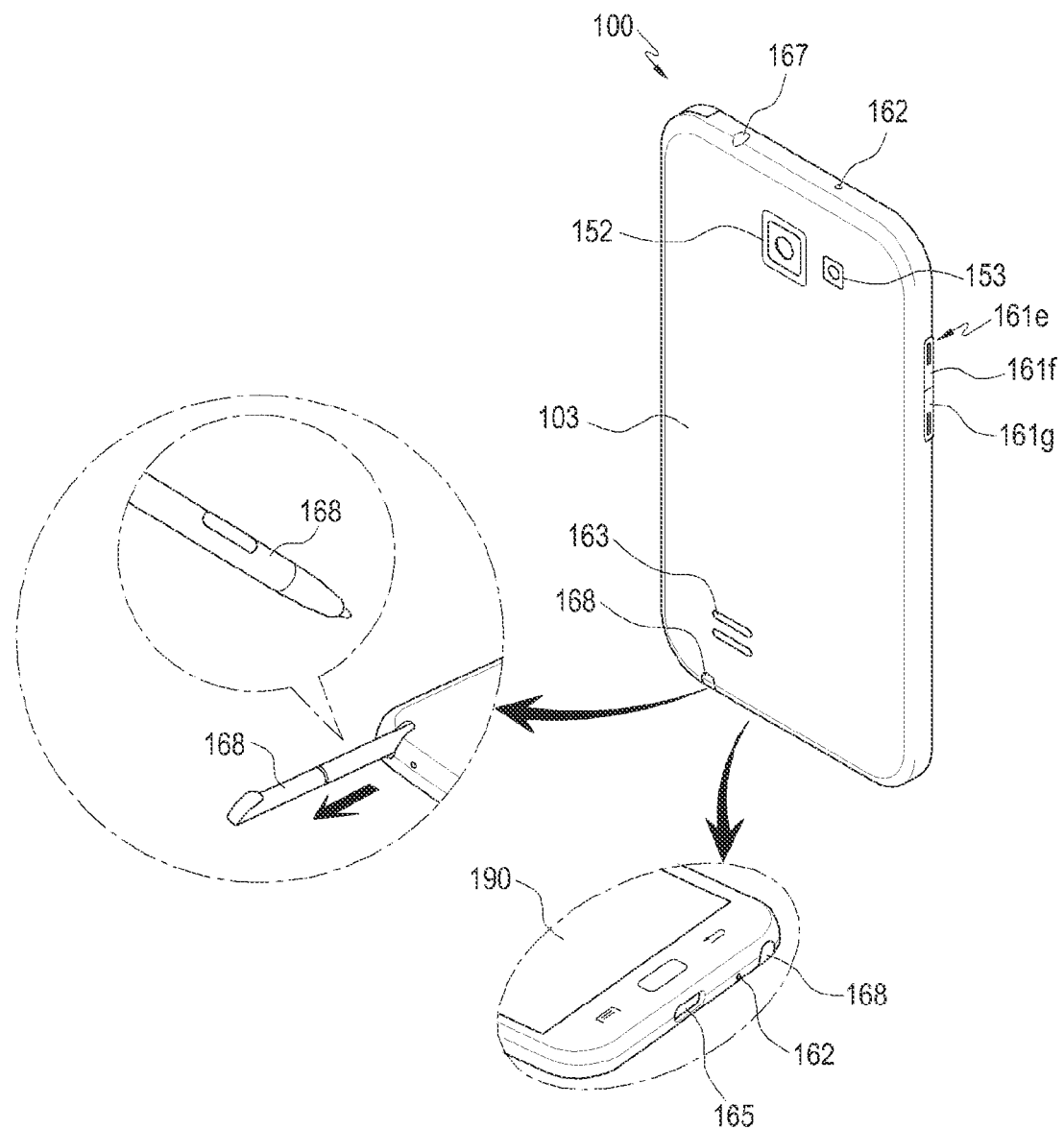
FIG. 3 is a rear perspective view illustrating an electronic device according to an embodiment of the present invention.

FIG. 2 is a front perspective view illustrating an electronic device according to an embodiment of the present invention, and FIG. 3 is a rear perspective view illustrating an electronic device according to an embodiment of the present invention.

Referring to FIGS. 2 and 3, a touch screen 190 is disposed at a central area of a front surface 101 of the electronic device 100. The touch screen 190 may be largely formed to occupy most of the front surface 101 of the electronic device 100. In FIG. 2, a main home screen is displayed on the touch screen 190. Shortcut icons 191-1, 191-2, and 191-3, a main menu converting key 191-4, a time, and weather are also displayed in the home screen. A menu screen is displayed on the touch screen 190. when a user selects the main menu converting key 191-4. Furthermore, a status bar 192 displays a status of the electronic device 100 such as a battery charging status, an intensity of a received signal, and a current time is formed at an upper end portion of the touch screen 190.

Touch keys, such as a home button 161a, a menu button 161b, and a back button 161c, mechanical buttons, or a combination of the touch keys and the mechanical buttons are formed below the touch screen 190. The touch keys may be formed as a portion of the touch screen 190.

The first camera 151, an illumination sensor 170a, and a proximity sensor 170b are disposed on an upper side of the front surface 101 of the electronic device 100. The second camera 152, a flash 153, and the speaker 163 are disposed on a rear surface 103 of the electronic device 100.

For example, a power/lockout button 161d, a volume button 161e including a volume increasing button 161f and a volume decreasing button 161g, a terrestrial DMB antenna 141a for reception of broadcasting, and one or a plurality of microphones 162 are disposed on a side surface 102 of the electronic device 100.

The connector 165 is formed at a lower side surface of the electronic device 100. The earphone jack 167 is formed at an upper side surface of the electronic device 100.

The input unit 168 is mounted at the lower side surface of the electronic device 100, and may be inserted into and kept in the electronic device 100, and may be extracted and detached from the electronic device 100 for use.

Figure 4:
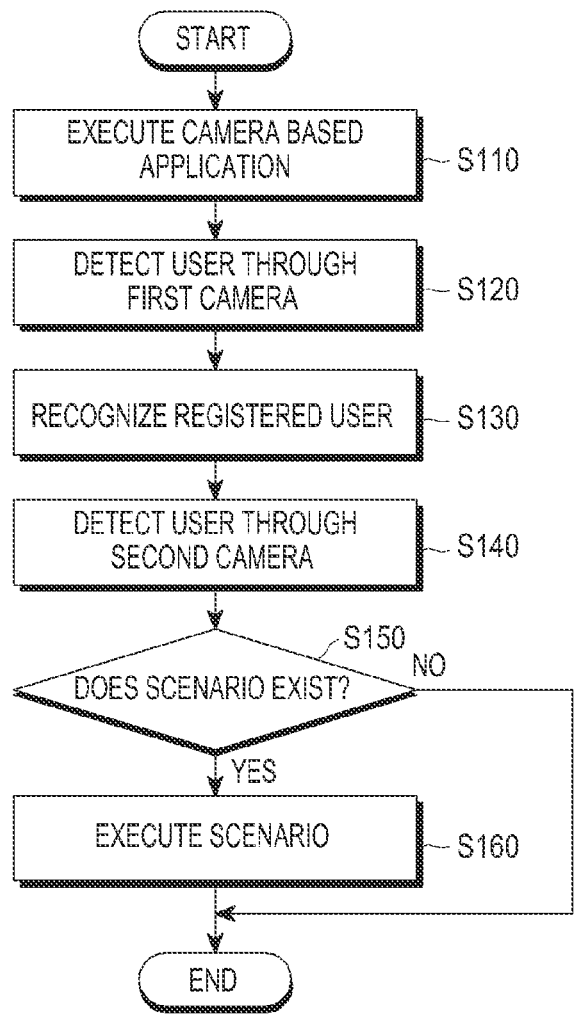
FIG. 4 is a flowchart illustrating a control method according to an embodiment of the present invention.

FIG. 4 is a flowchart illustrating a control method according to an embodiment of the present invention.

Referring to FIG. 4, in step S110, a camera based application is executed. For example, a user may execute an application mapped onto an icon, by touching the desired icon on the touch screen 190. As described above, the controller 110 may receive a user input through the communication unit 120, the camera module 150, the input/output module 160, the sensor module 170, or the touch screen 190. Although the application is executed according to the user input in FIG. 4, the application may also be automatically executed according to an occurrence of an event, e.g., such as message reception, call reception, and alarm event.

In step S120, the controller 110 detects a user through the first camera 151. In detecting the user, the controller 110 determines whether or not a subject included in an image captured by the first camera 151 includes a body part of the user such as a face, hand, etc., or the user's whole body.

For example, face recognition may be performed using a general face recognition method, in which face recognition technology using a contour of a face, a color and/or the texture of a face skin, a template, or the like, which are stored in a storage unit 175, may be used. For example, the controller 110 may perform face learning through face images of a plurality of users, and recognize a face from an input image based on the face learning. The face learning information is stored in the storage unit 175.

In step S130, the controller 110 determines whether or not the detected user is registered in advance in the electronic device 100. The registered user image may be an image of a face, a hand, an eye, or a nose, or a combination thereof. The information used for detecting the registered user may include a user image, a characteristic point (also referred to as a characteristic image and a characteristic pattern) information of the user image, face learning data, or the like. For example, the characteristic point may be an edge, a corner, an image pattern, an outline, or the like.

Alternatively, step S120 or step S130 may be omitted. That is, the method in FIG. 4 may be performed by targeting an arbitrary user or the registered user.

For example, when targeting a registered user, the controller 110 may determine whether or not a registered user's face is included in an image by detecting an image area matching the registered user, i.e., by matching characteristic points of the registered user image and characteristic points detected from the input image.

Further, the controller 110 may also register a user detected through the first camera 151 in step S120.

In step S140, the controller 110 detects the user detected through the first camera 151 (i.e., the registered user or an arbitrary user) through the second camera 152. For example, the controller 110 may determine whether or not a user having been detected through the first camera 151 is detected through the second camera 152, after disappearing from view of the first camera 151.

In step S150, the controller 110 determines whether or not an operation scenario (namely, a programmed operation) according to the user detection through the first and the second cameras 151 and 152 exists. The operation scenario may be an execution of a camera based application or a preset function of the electronic device 100, a change of an activated camera, a change of a user input interface, a change or interruption of a screen, interruption of a specific function of the electronic device, etc. When the operation scenario exists, the controller 110 executes the operation scenario in step S160. However, when a non-operation scenario exists, the controller 110 terminates the method. The operation scenario, i.e., preset function information of the electronic device 100, is stored in advance in the storage unit 175.

Figure 5:
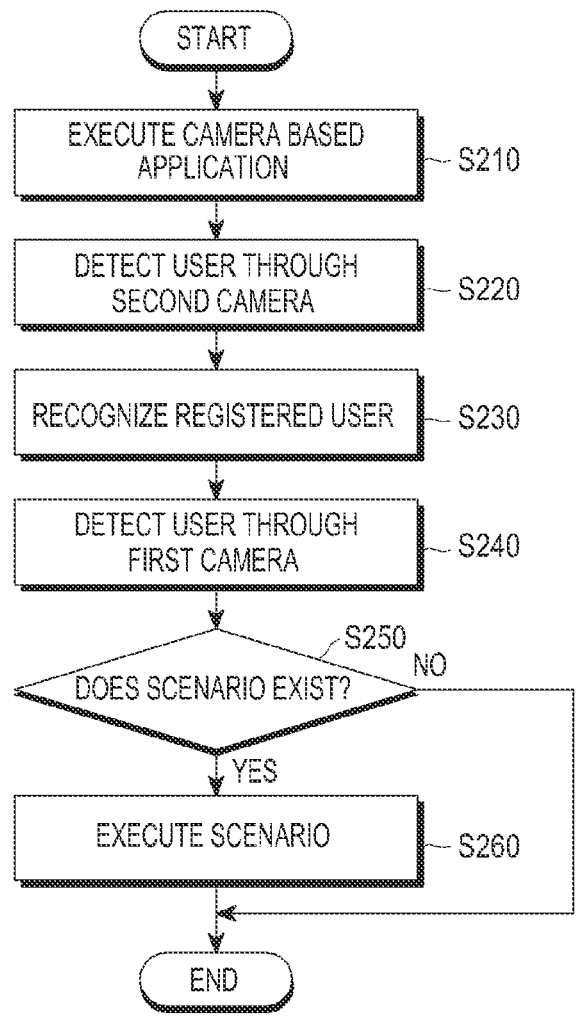
FIG. 5 is a flowchart illustrating a control method according to an embodiment of the present invention.

FIG. 5 is a flowchart illustrating a control method according to an embodiment of the present invention.

Referring to FIG. 5, steps S210 to S260 are identical to steps S110 to 160, except that step S220 detects a user through the second camera 152 and step S240 detects the user through the first camera 151. Accordingly, a repetitive detailed description of these steps will be omitted.

In the methods illustrated in FIGS. 4 and 5, the first and the second cameras 151 and 152 may be simultaneously or sequentially activated. For example, the first and the second cameras 151 and 152 may be sequentially activated to minimize power consumption and reduce a load of the controller 110.

Herein, the activated state of the camera implies a power on state of the camera or a state in which a preview image (or a live preview image) is generated and/or displayed, and the deactivated state of the camera implies a power off state of the camera or a state in which a preview image is not generated or displayed. The preview image is converted or processed from a raw image output through the camera to be suitable for settings such as a resolution and a screen size of the touch screen 190.

Figure 6:
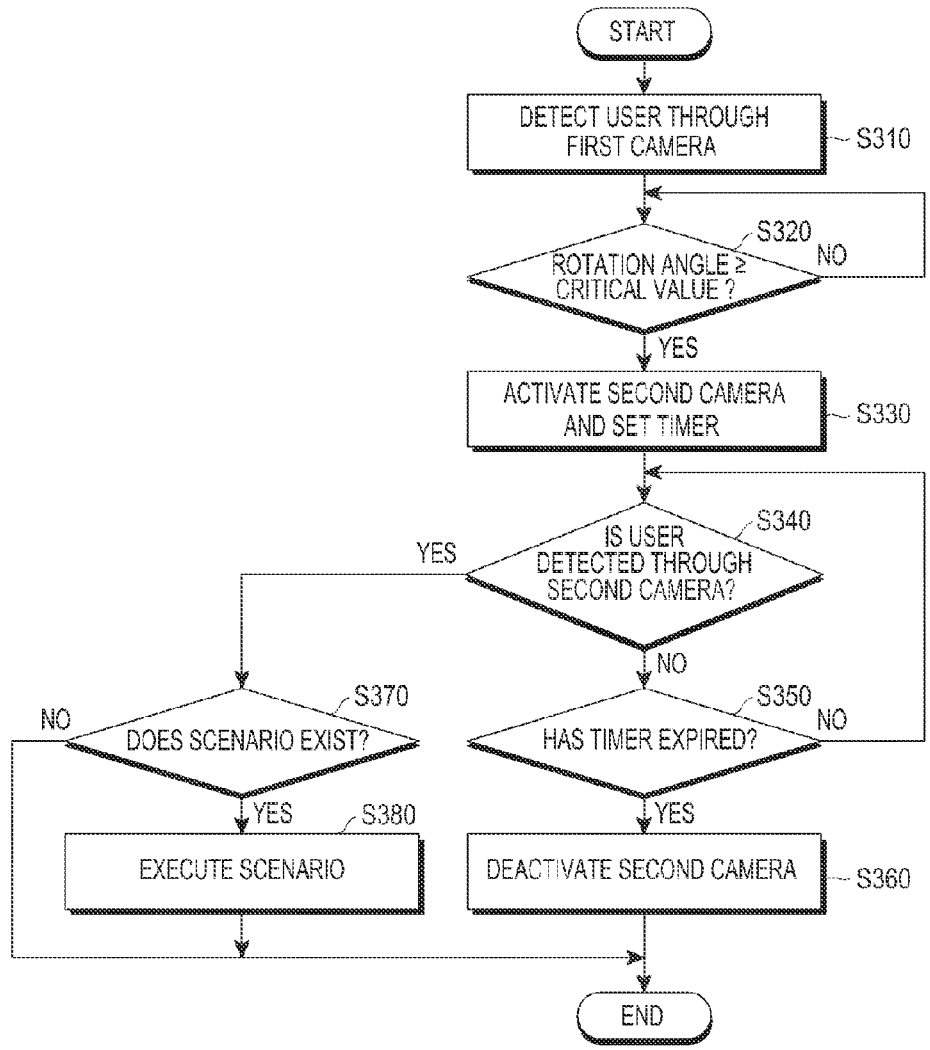
FIG. 6 is a flowchart illustrating a method for sequentially activating a first camera and a second camera according to an embodiment of the present invention.

FIG. 6 is a flowchart illustrating a method for sequentially activating first and second cameras according to an embodiment of the present invention.

Referring to FIG. 6, in step S310, the controller 110 detects a user through the first camera 151.

In step S320, the controller 110 detects rotation of the electronic device 100, e.g., through a gyroscope of a sensor module 170, and determines whether or not a rotation angle of the electronic device 100 is greater than or equal to a predetermined angle (or critical value). For example, the controller 110 stores an angular position of the electronic device 100 as a reference, when detecting a user, and detects a rotation angle of the electronic device 100 with respect to the reference angular position.

In step S330, the controller 110 activates the second camera 152 and sets a timer having a preset time limit (namely, a critical value), when the rotation angle of the electronic device 100 is greater than or equal to the predetermined angle. For example, the time limit of the timer may be 3 seconds, and the timer may count down from 3 seconds to 0 seconds. When a residual time of the timer is 0 seconds, the timer may notify the controller 110 of expiration thereof, or the controller may detect the expiration of the timer. Alternatively, the timer may count up from 0 seconds to 3 seconds, and may notify the controller 110 of expiration thereof, or the controller 110 may detect the expiration of the timer.

In step S340, the controller 110 determines whether or not the user is detected through the second camera 152. When a user is not detected, in step S350, the controller 110 determines whether or not the timer has expired. The controller 110 repeats step 340 until the user is detected or the timer expires in step S350.

When the timer expires in step S350, in step S360, the controller 110 deactivates the second camera 152.

Although FIG. 6 illustrates a method with the first camera 151 initially detecting the user and the second camera 152 being activated thereafter, the same method may also be performed with the second camera 152 initially detecting the user and the first camera 151 being activated thereafter.

In step S370, the controller 110 determines whether or not an operation scenario (namely, a programmed operation) according to the user detection through the first and the second cameras 151 and 152 exists. The operation scenario may be an execution of a camera based application or a preset function of the electronic device 100, a change of an activated camera, a change of a user input interface, a change or interruption of a screen, interruption of a specific function of the electronic device, etc. When the operation scenario exists, the controller 110 executes the operation scenario in step S380. However, when a non-operation scenario exists, the controller 110 terminates the method. The operation scenario, i.e., preset function information of the electronic device 100, is stored in advance in the storage unit 175.

Figure 7:
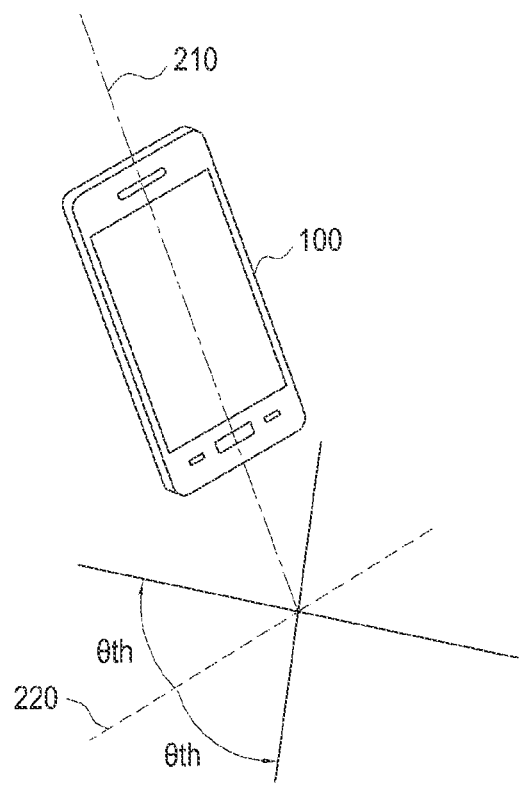
FIG. 7 illustrates rotation of an electronic device according to an embodiment of the present invention.

FIG. 7 is a perspective view illustrating rotation of an electronic device according to an embodiment of the present invention.

Referring to FIG. 7, the electronic device 100 may rotate in a clockwise or counterclockwise direction about a lengthwise central axis 210. The controller 110 sets a critical angle (θth) of clockwise or counterclockwise rotation with respect to an initial angular position 220 of the electronic device 100, and determines whether or not a rotation angle of the electronic device 100 is greater than or equal to a predetermined angle (namely, a critical angle).

Figure 8:
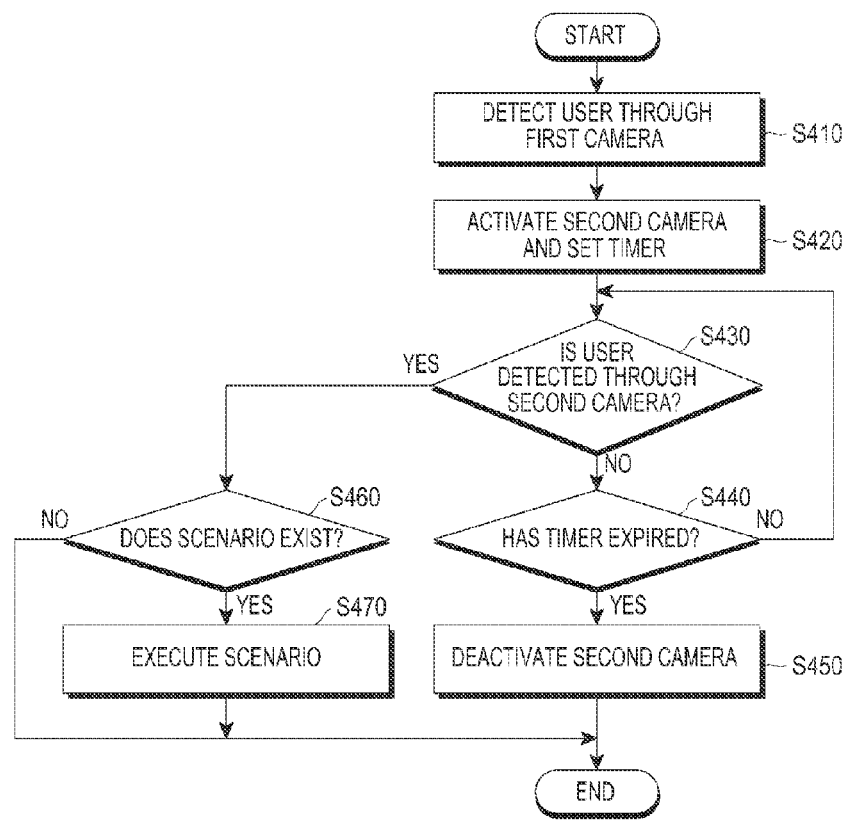
FIG. 8 is a flowchart illustrating a method for sequentially activating a first camera and a second camera according to an embodiment of the present invention.

FIG. 8 is a flowchart illustrating a method for sequentially activating a first camera and a second camera according to an embodiment of the present invention.

Referring to FIG. 8, in step S410, the controller 110 detects a user through the first camera 151. In step S420, the controller 110 activates the second camera 152 and sets a timer having a preset time limit (namely, a critical value).

In step S430, the controller 110 determines whether or not the user is detected through the second camera 152, before the timer expires. When the user is not detected through the second camera 152, the controller 110 determines if the timer has expired in step S440.

The controller 110 repeats step S430, until the user is detected through the second camera 152 or the timer expires.

When the timer expires in step S440, prior to the user being detected, the controller 110 deactivates the second camera 152 in step S450.

In step S460, the controller 110 determines whether or not an operation scenario (namely, a programmed operation) according to the user detection through the first and the second cameras 151 and 152 exists. The operation scenario may be an execution of a camera based application or a preset function of the electronic device 100, a change of an activated camera, a change of a user input interface, a change or interruption of a screen, interruption of a specific function of the electronic device, etc. When the operation scenario exists, the controller 110 executes the operation scenario in step S470. However, when a non-operation scenario exists, the controller 110 terminates the method. The operation scenario, i.e., preset function information of the electronic device 100, is stored in advance in the storage unit 175.

Although FIG. 8 illustrates a method with the first camera 151 initially detecting the user and the second camera 152 being activated thereafter, the same method may also be performed with the second camera 152 initially detecting the user and the first camera 151 being activated thereafter.

Figure 9:
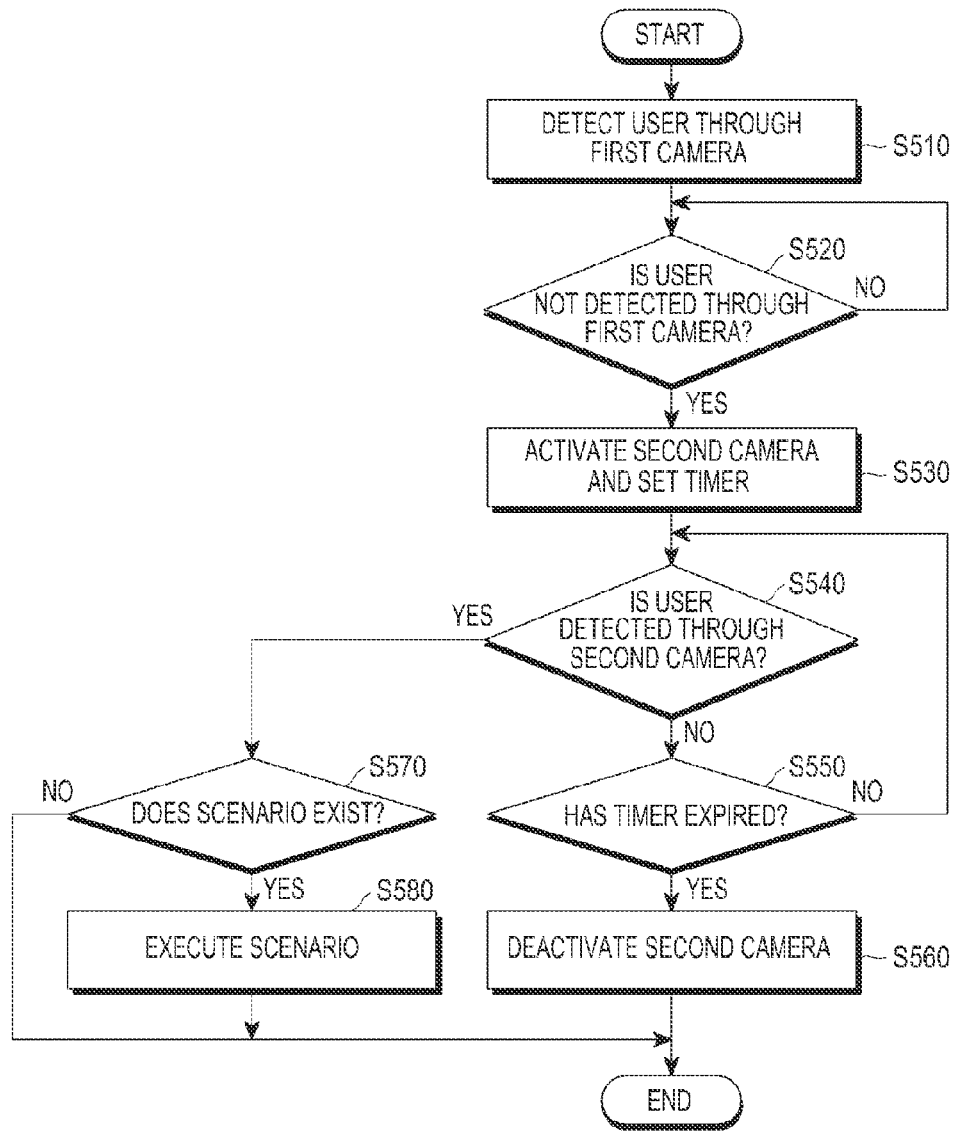
FIG. 9 is a flowchart illustrating a method for sequentially activating a first camera and a second camera according to an embodiment of the present invention.

FIG. 9 is a flowchart illustrating a method for sequentially activating a first camera and second camera according to an embodiment of the present invention.

Referring to FIG. 9, in step S510 the controller 110 detects a user through the first camera 151. In step S520 the controller 110 periodically checks whether or not the user having been detected through the first camera 151 goes out of view of the first camera 151. When the user is not detected through the first camera 151 any longer, the controller 110 activates the second camera 152 and sets a timer having a preset time limit in step S530.

In step S540, the controller 110 determines whether or not a user is detected through the second camera 152 within the time limit of the timer. When a user is not detected the controller 110 determines whether the timer has expired in step S550.

The controller 110 repeats step S540, until the user is detected through the second camera 152 or the timer expires in step S550.

When a user is not detected through the second camera 152 and the timer expires in step S550, the controller 110 deactivates the second camera 152 in step S560.

In step S570, the controller 110 determines whether or not an operation scenario (namely, a programmed operation) according to the user detection through the first and the second cameras 151 and 152 exists. The operation scenario may be an execution of a camera based application or a preset function of the electronic device 100, a change of an activated camera, a change of a user input interface, a change or interruption of a screen, interruption of a specific function of the electronic device, etc. When the operation scenario exists, the controller 110 executes the operation scenario in step S580. However, when a non-operation scenario exists, the controller 110 terminates the method. The operation scenario, i.e., preset function information of the electronic device 100, is stored in advance in the storage unit 175.

Although FIG. 9 illustrates a method with the first camera 151 initially detecting the user and the second camera 152 being activated thereafter, the same method may also be performed with the second camera 152 initially detecting the user and the first camera 151 being activated thereafter.

FIGS. 10A, 10B, 11A, and 11B illustrate examples of screen images displayed during an electronic device control method according to an embodiment of the present invention. In conventional timer photography, the photograph is often taken before a user gets to a desired position. Therefore, in accordance with an embodiment of the present invention, a timer is started after a user is detected in an image captured by a second camera 152, which makes it possible for the user to perform timer photographing with the user in a correct position.

Figure 10A:
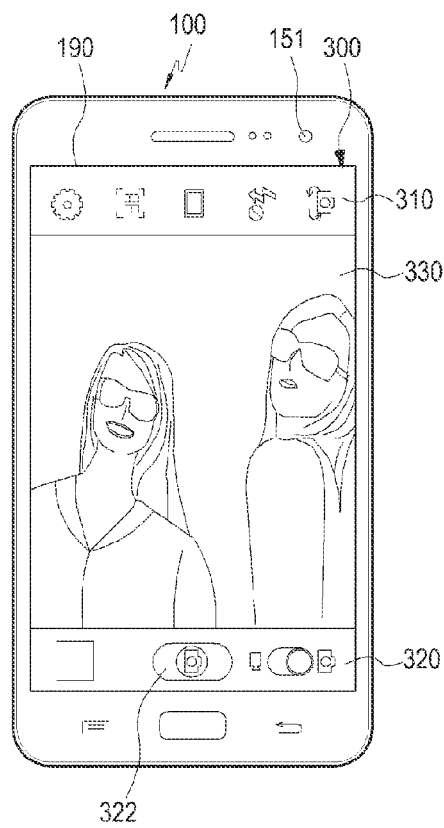
FIGS. 10A, 10B, 11A, and 11B illustrate examples of screen images displayed during an electronic device control method according to an embodiment of the present invention.

Referring to FIG. 10A, a camera application screen 300 (or a camera application window) is displayed on the touch screen 190 of the electronic device 100, when a first user executes a camera application. A first menu bar 310, a second menu bar 320, and a preview image 330 are displayed on the camera application screen 300. The preview image 330 shows second and third users who are waiting for the first user for timer photography. The preview image 330 corresponds to an image with a low resolution (or a small number of pixels), and an image that is photographed and stored through a capture button 322 corresponds to an image with a high resolution (or a large number of pixels). Hereinafter, although a still image will be representatively mentioned as a stored image, the stored image may also be a moving image.

The first menu bar 310 includes an environment configuration menu, and the second menu bar 320 includes the capture button 322. The first user may select the environment configuration menu of the first menu bar 310 for the timer photography, select a timer item in the environment configuration menu, and set a timer time. For example, the first user set the timer time to 5 seconds.

The controller 110 captures and detects an image of the first user using the first camera 151, when the first user selects the capture button 322. The controller 110 recognizes that the first user detected through the first camera 151 is a registered user, e.g., through image matching using a database of the storage unit 175. Alternatively, the controller 110 may simply determine whether or not an arbitrary user is detected in the image output from the first camera 151, irrespective of registration.

The controller 110 may also register the first user photographed by the first camera 151 in the database of the storage unit 175. That is, the controller 110 may store information used for detecting the first user, including the image of the first user and/or a characteristic point (or also referred to as a characteristic image or a characteristic pattern) information of a first user image, in the database of the storage unit 175. The registered information of the first user is used for detecting the first user in the image photographed by the second camera 152.

Figure 10B:
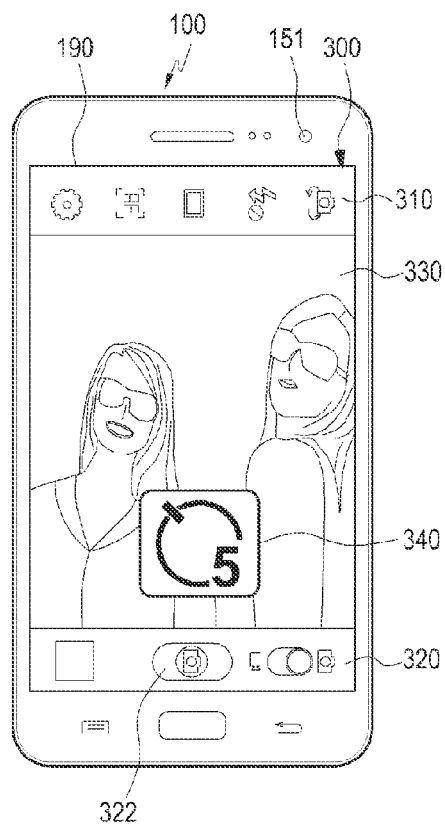

Referring to FIG. 10B, an indicator 340 representing the timer photography is displayed on the touch screen 190, when the first user selects the capture button 322, although the timer does not start until the registered first user is detected in the image photographed by the second camera 152.

Figure 11A:
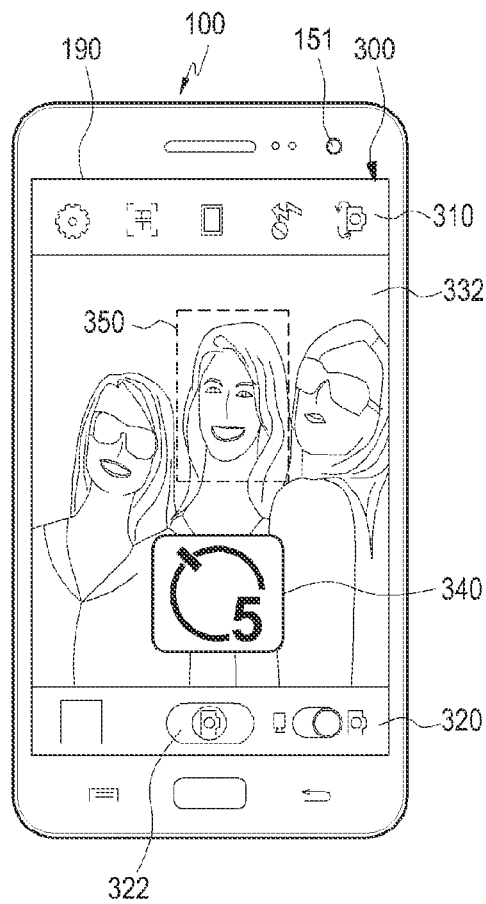

Referring to FIG. 11A, a preview image 332 shows the first to third users waiting for the timer photography. The controller 110 detects the first user 350 in an image captured by the second camera 152, and recognizes that the first user photographed by the second camera 152 is the registered user, though image matching using the database of the storage unit 175.

Thereafter, the controller 110 starts the timer according to detection of the registered first user.

Figure 11B:
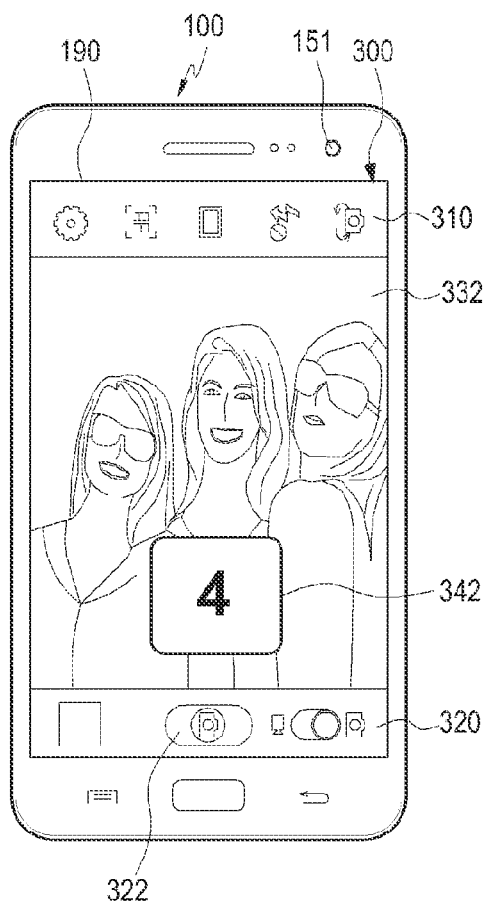

Referring to FIG. 11B, the timer counts down from 5 seconds to 0 seconds, and the controller 110 photographs a high resolution still image through the second camera 152 and stores the still image in the storage unit 175, when the timer expires. Specifically, FIG. 11B illustrates a timer indicator 342 that indicates 4 seconds.

FIGS. 12A, 12B, 13A, and 13B illustrate examples of screen images displayed during an electronic device control method according to an embodiment of the present invention. In accordance with an embodiment of the present invention, a user is to perform self-photographing by using a second camera 152 with a relatively high resolution. However, because the user cannot view a preview image in the self-photographing using the second camera 152, a face of the user may be too large or small in the photographed image. In FIGS. 12A, 12B, 13A, and 13B, the self-photographing is performed to a zoom level set by the user.

Figure 12A:
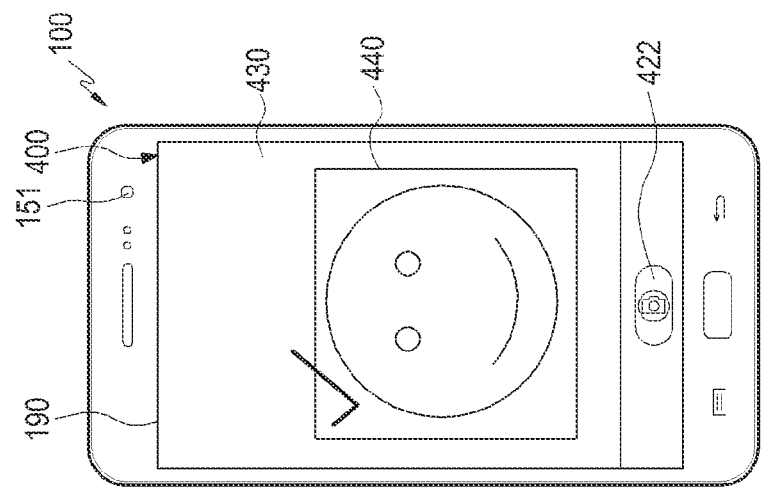

Referring to FIG. 12A, a self camera application screen 400 (or a camera application window) is displayed on the touch screen 190 of the electronic device 100 when a user 401 executes a self-photography mode of a self camera application or a camera application. A capture button 422 and a preview image 430 are displayed on the self camera application screen 400. An image captured by the first camera 151 is displayed in the preview image 430, which includes a face image 440 of the user that is detected by a controller 110.

Figure 12B:
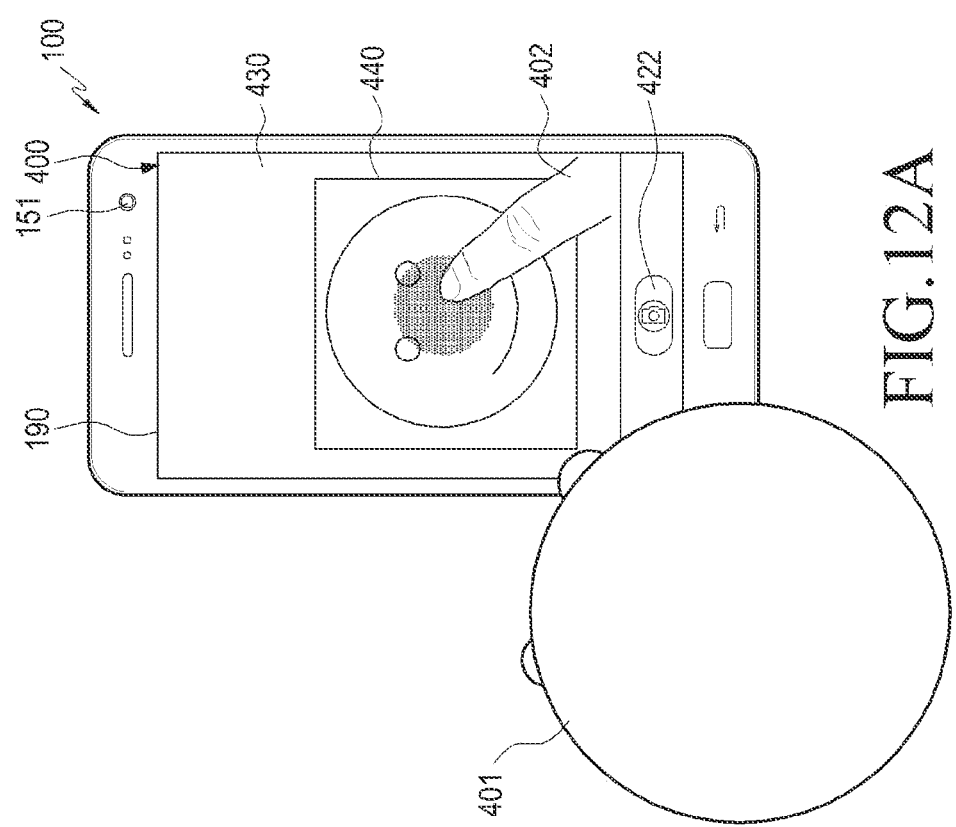

When the user touches the touch screen 190 with a finger 402 as illustrated in FIG. 12A, the controller 110 stores the detected face image 440 or a size of the face image in a storage unit 175, as illustrated in FIG. 12B. That is, the face of the user in the preview image may be enlarged or reduced through an adjustment of the zoom level.

Referring to FIG. 13A, the user 401 rotates the electronic device 100, and photographs the user's own image through the second camera 152. The controller 110 detects a face 442 of the user in an image that is photographed by the second camera 152, and adjusts a zoom level of the second camera 152, such that a face size of the user in the preview image 432 corresponds to the size of the stored face image 440.

Referring to FIG. 13B, the controller 110 photographs a still image though the second camera 152 and stores the still image in the storage unit 175, when the user touches an arbitrary point on the touch screen 190. FIG. 13B illustrates an enlarged face image 444 that corresponds to the detected face image 440.

FIGS. 14A, 14B, 15A, and 15B illustrate examples of screen images displayed during an electronic device control method according to an embodiment of the present invention.

Figures 14A, 14B:
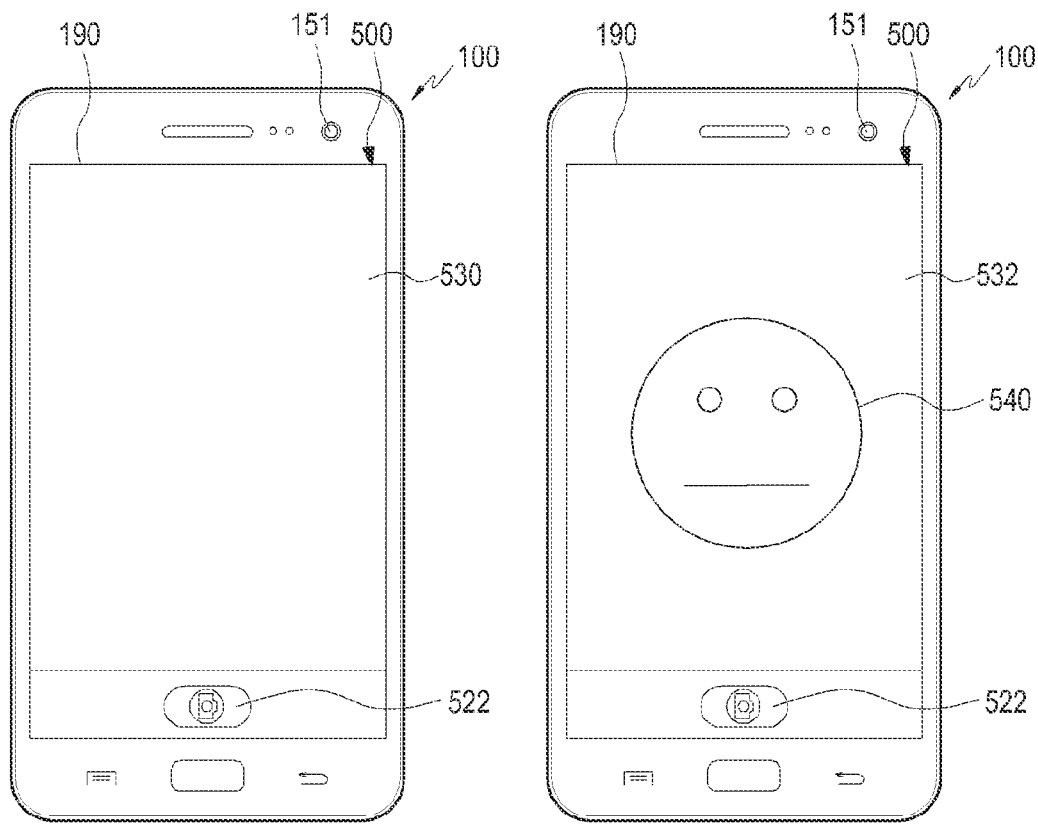
FIGS. 14A, 14B, 15A, and 15B illustrate examples of screen images displayed during an electronic device control method according to an embodiment of the present invention.

Referring to FIG. 14A, a camera application screen 500 (or a camera application window) is displayed on the touch screen 190 of the electronic device 100, when a user executes a camera application. An image that is captured by the second camera 152 is displayed in a preview image 530.

Referring to FIG. 14B, a user executes a self-photography mode of the camera application, and the controller 110 provides an image 532, which is photographed by the first camera 151, as a preview image and detects a user 540 in the image photographed by the first camera 151.

Figures 15A, 15B:
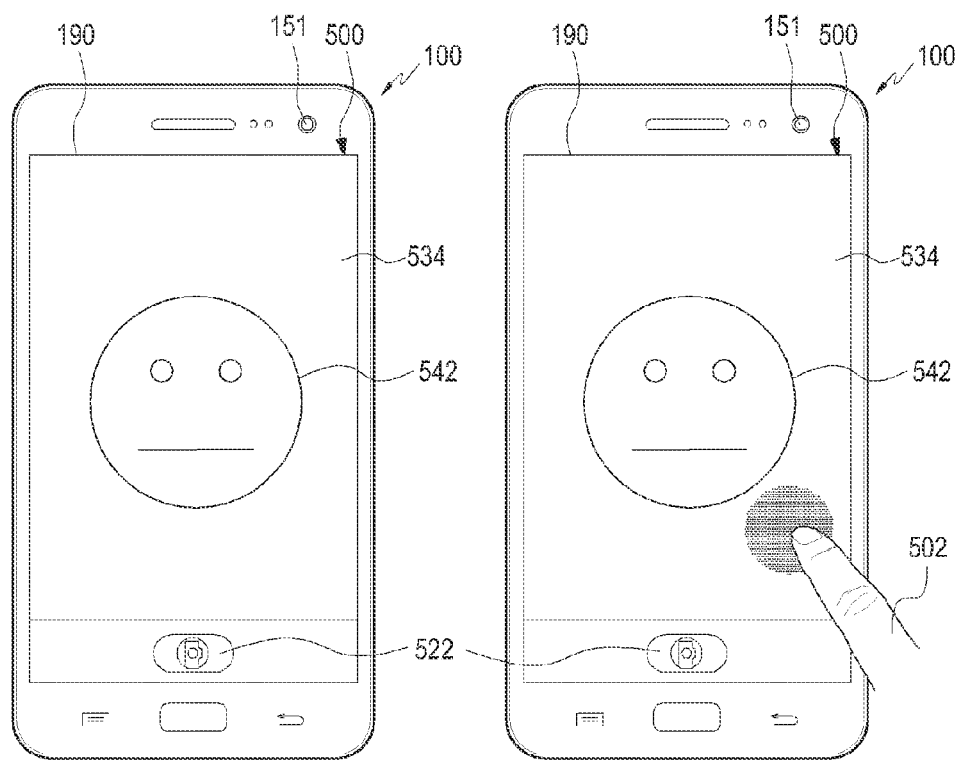

Referring to FIG. 15A, after the user disappears from view of the first camera 151, the controller 110 changes the preview image through the first camera 151 to a preview image 534 through the second camera 152, when detecting the user 540 in the image captured by the second camera 152. FIG. 15A illustrates a face 542 of the detected user 540.

Referring to FIG. 15B, the controller 110 photographs a still image through the second camera 152 and stores the still image in the storage unit 175, when the user touches an arbitrary point of the touch screen 190 or a capture button 522 with a finger 502.

Figures 16A, 16B:
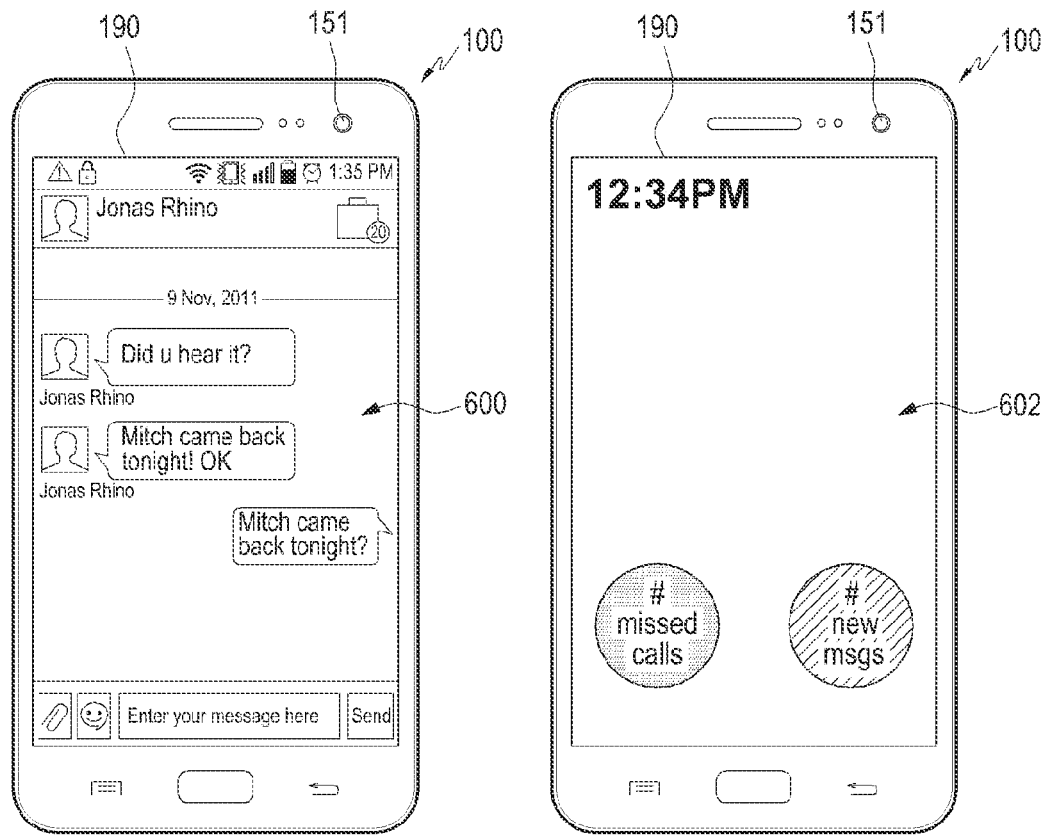
FIGS. 16A and 16B illustrate examples of screen images displayed during an electronic device control method according to an embodiment of the present invention.

FIGS. 16A and 16B illustrate examples of screen images displayed during an electronic device control method according to an embodiment of the present invention.

Referring to FIG. 16A, a Social Networking Service (SNS) application screen 600 (or an SNS application window) is displayed on the touch screen 190 of the electronic device 100, when a user executes an SNS application. The user chats with a counterpart through a message in the SNS application screen.

The controller 110 detects a user through the first camera 151. The controller 110 may determine whether or not the user detected through the first camera 151 goes out of view of the first camera 151. Thereafter, the controller 110 may determine whether or not the user is now detected through the second camera 152.

Referring to FIG. 16B, the controller 110 prevents private information of the user from being shown to other people through interception of the SNS application screen 600, when the user goes out of the view of the first camera 151, or thereafter, is detected through the second camera 152. In accordance with an embodiment of the present invention, the controller 110 displays a lockout screen 602 on the touch screen 190.

Figure 17A:
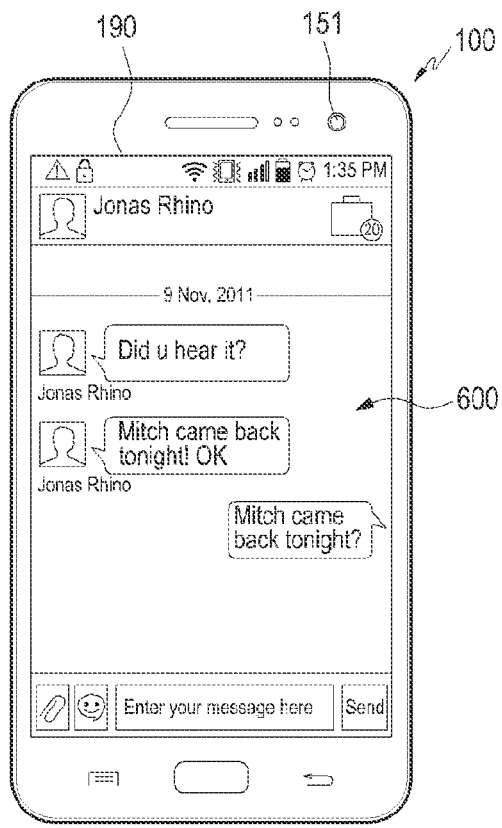
FIGS. 17A and 17B illustrate examples of screen images displayed during an electronic device control method according to an embodiment of the present invention.
Figure 17B:
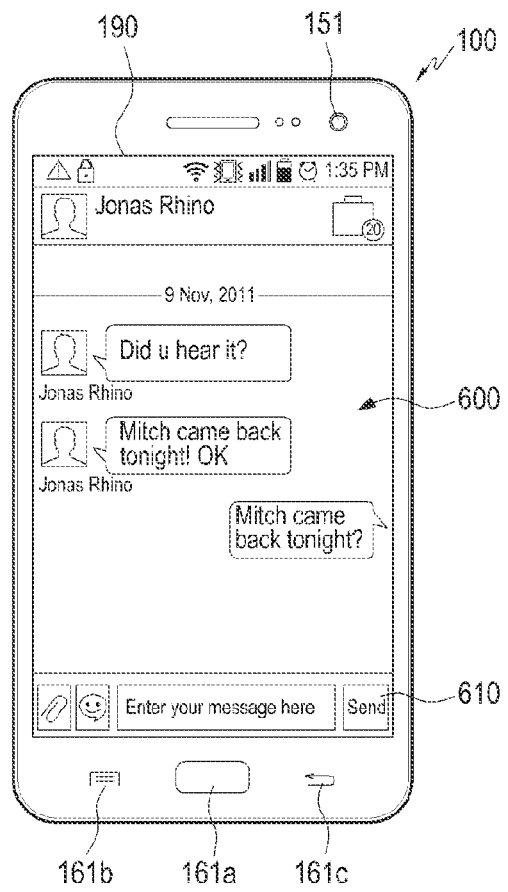

FIGS. 17A and 17B illustrate examples of screen images displayed during an electronic device control method according to an embodiment of the present invention.

Referring to FIG. 17A, the SNS application screen 600 (or SNS application window) is displayed on the touch screen 190 of the electronic device 100, when a user executes the SNS application. The user chats with a counterpart through a message in the SNS application screen.

The controller 110 detects the user through the first camera 151. The controller 110 may determine whether or not the user detected through the first camera 151 goes out of view of the first camera 151. Thereafter, the controller 110 may determine whether or not the user is now detected through the second camera 152.

Referring to FIG. 17B, the controller 110 prevents an unintended input from occurring due to a user's mistake, through interception of at least a part or all of touch keys such as a home button 161a, menu button 161b, and a back button 161c, soft buttons such as a sending button 610 on the touch screen 190, or an arbitrary touch input on the touch screen 190, when the user goes out of the view of the first camera 151 or thereafter, is detected through the second camera 152.

The camera based electronic device control methods according to the above-described embodiments of the present invention may be applied to a variety of electronic devices in addition to a smart phone. For example, the camera based electronic device control methods may be applied to a folder phone.

Figure 18A:
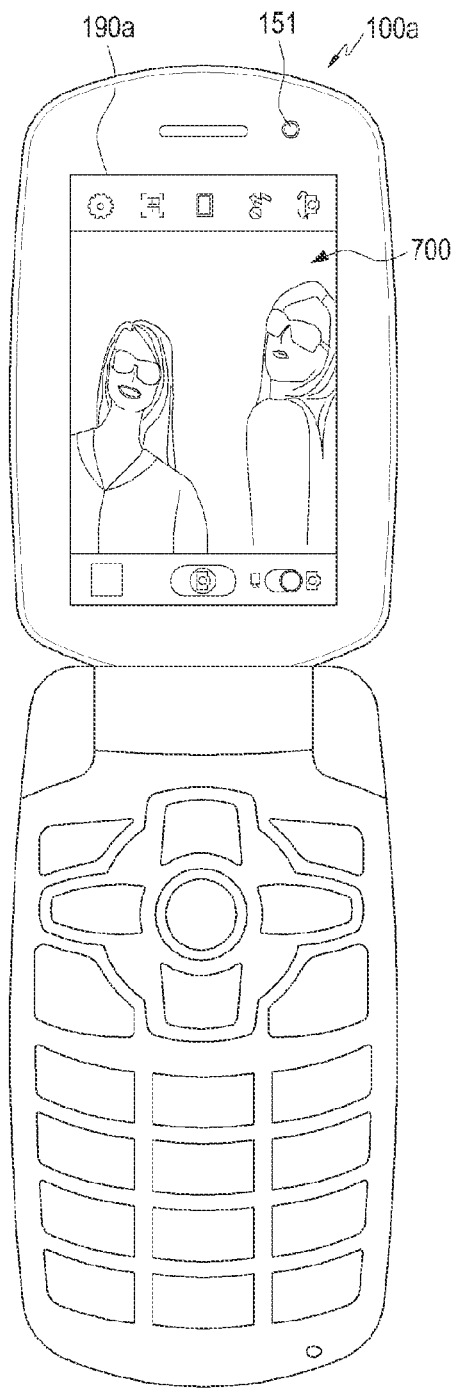
FIGS. 18A and 18B illustrates examples of screen images displayed during an electronic device control method according to an embodiment of the present invention.
Figure 18B:
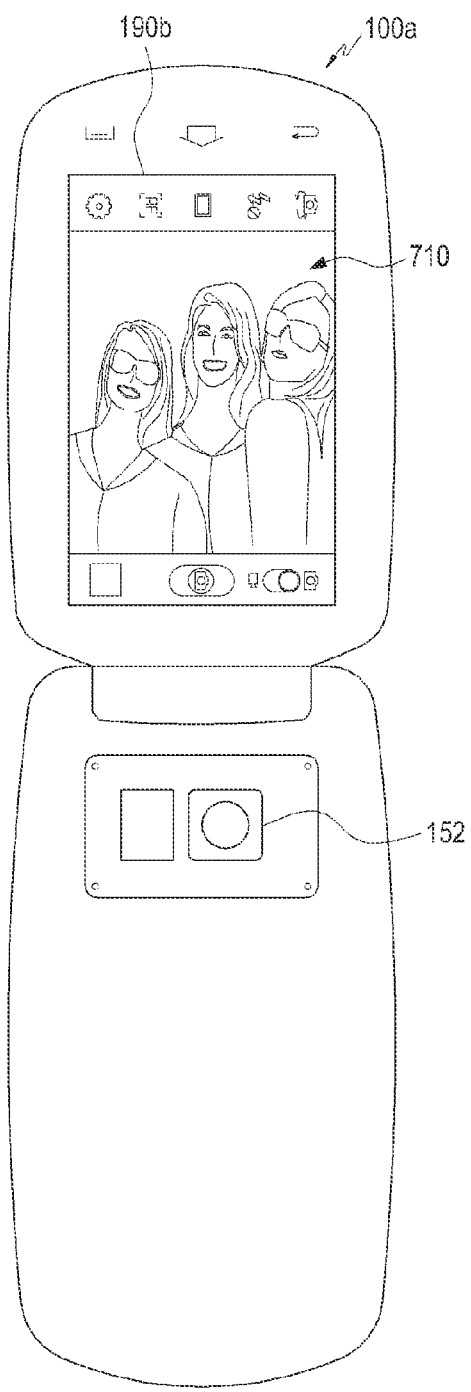

FIGS. 18A and 18B illustrate examples of screen images displayed during an electronic device control method according to an embodiment of the present invention. Specifically, FIG. 18 illustrates a dual screen folder phone 100a having first and second touch screens 190a and 190b. The dual screen folder phone 100a has a similar configuration to the electronic device illustrated in FIG. 1, except for the two touch screens. Hereinafter, identical elements are denoted by identical reference numerals.

Referring to FIG. 18A, a camera application screen 700 (or a camera application window) is displayed on the first touch screen 190a of the dual screen folder phone 100a, when a user executes a camera application. A preview image that is photographed through the second camera 152 is displayed on the camera application screen 700.

The controller 110 detects a user through the first camera 151. The controller 110 may determine whether or not the user detected through the first camera 151 goes out of view of the first camera 151. The controller 110 may then determine whether or not the user detected through the first camera 151 is detected through the second camera 152, after going out of the view of the first camera 151.

Referring to FIG. 18B, the controller 110 displays a camera application screen 710 on the second touch screen 190b, and the camera application screen 710 includes a preview image photographed through the second camera 152, when the user goes out of the view of the first camera 151, or thereafter, is detected through the second camera 152.

Figure 19:
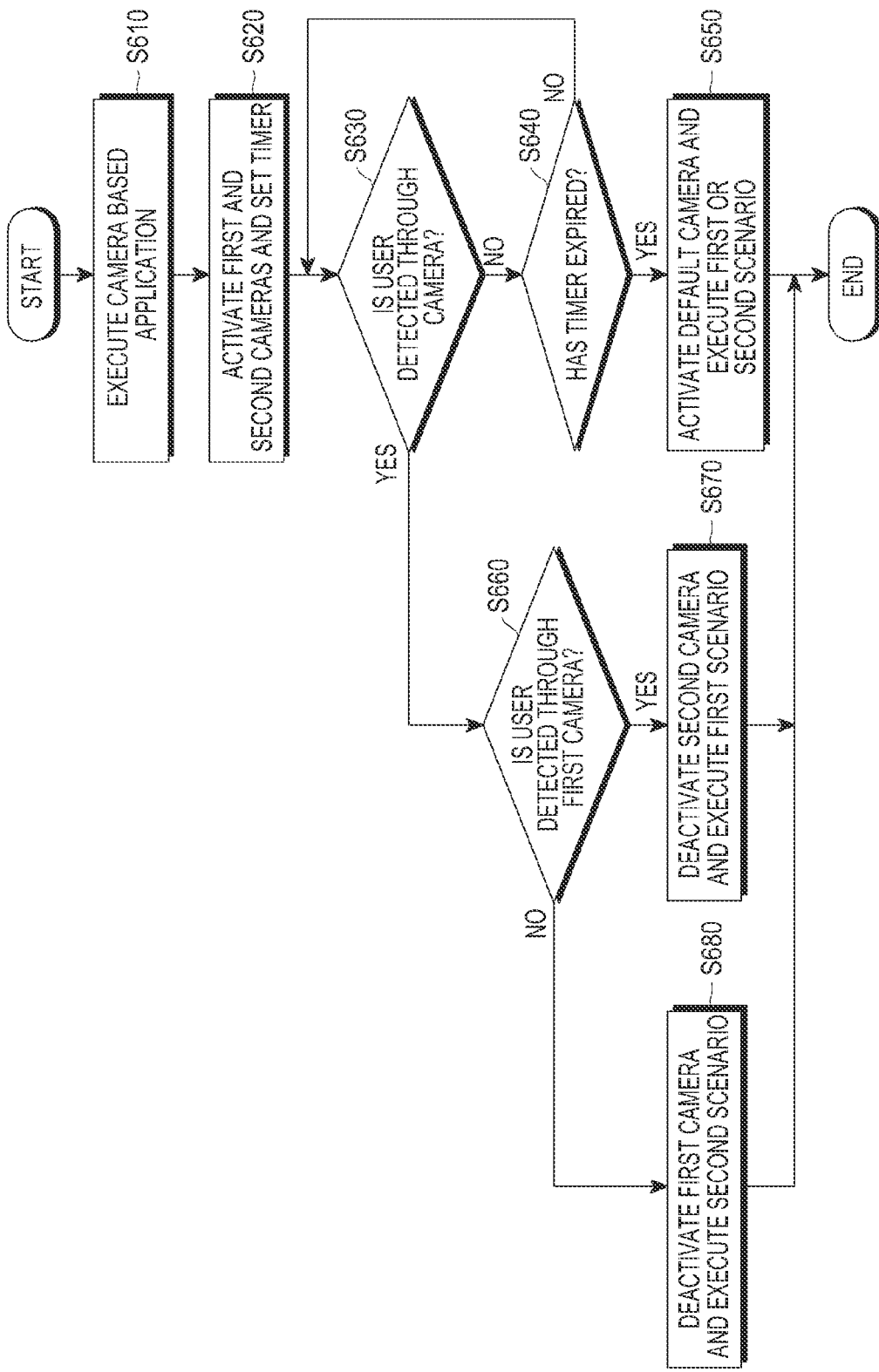
FIG. 19 is a flowchart illustrating a control method according to an embodiment of the present invention.

FIG. 19 is a flowchart illustrating a control method according to an embodiment of the present invention.

Referring to FIG. 19, in step S610, a camera based application is executed, e.g., a user executes an application mapped to an icon, by touching the desired icon displayed on the touch screen 190.

In step S620, the controller 110 activates the first and second cameras 151 and 152 and sets a timer having a preset time limit (namely, a critical value).

In step S630, the controller 110 determines whether or not a user is detected through the first camera 151 or the second camera 152. When a user is not detected, the controller 110 determines if the timer has expired in step S640.

The controller 110 repeats step S630, until the user is detected through the first camera 151 or the second camera 152 or the timer expires in step S640.

When a user is not detected through the first camera 151 or the second camera 152 and the timer expires in step S640, the controller 110 activates a default camera among the first camera 151 and the second camera 152, deactivates the remaining camera, and executes first or second operation scenario (namely, a programmed operation), based on whether the default camera is the first camera 151 or the second camera 152. As described above, the operation scenarios may include execution of a camera based application or a preset function of a electronic device 100, a change of an activated camera, a change of a user input interface, a change or interruption of a screen, interruption of a specific function of the electronic device 100, etc.

When a user is detected through the first camera 151 or the second camera 152 prior to expiration of the timer, the controller 110 determines whether or not the user is detected through the first camera 151 in step S660, i.e., whether the user was detected by the first camera 151 or the second camera 152. When the user is detected through the first camera 151 in step S660, the controller 110 deactivates the second camera 152 and executes the first operation scenario (namely, the programmed operation) using the first camera 151 in step S670.

When the user is not detected through the first camera 151, i.e., is detected through the second camera 152, in step S660, the controller 110 deactivates the first camera 151 and executes the second operation scenario (namely, the programmed operation) using the second camera 152 in step S680.

FIGS. 20A, 20B, 21A, and 21B illustrate examples of screen images displayed during an electronic device control method according to an embodiment of the present invention.

Figure 20A:
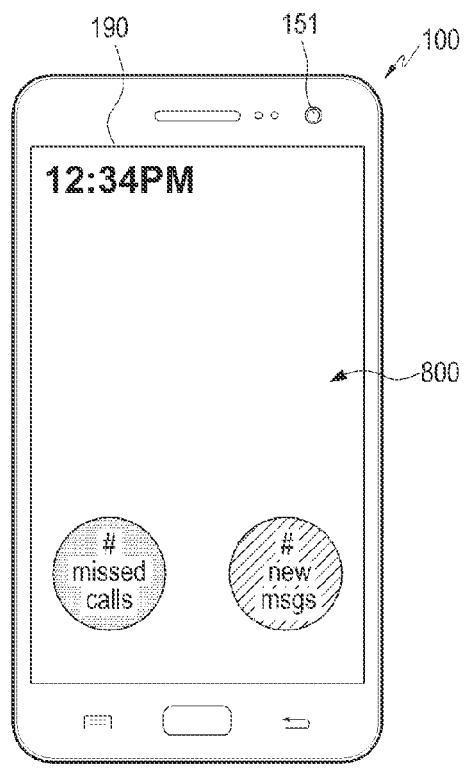
FIGS. 20A, 20B, 21A, and 21B illustrate examples of screen images displayed during an electronic device control method according to an embodiment of the present invention.

Referring to FIG. 20A, a lockout screen 800 is displayed on the touch screen 190 when a preset time passes without a user input. A function of completely unlocking the lockout screen when a face of a registered user is detected has been set in advance in the electronic device 100.

The controller 110 completely unlocks the lockout screen 800 when the user is detected through the first camera 151. The home screen as illustrated in FIG. 2 or an application screen shortly before the lockout may be displayed on the touch screen 190 when the lockout screen is completely unlocked.

Figure 20B:
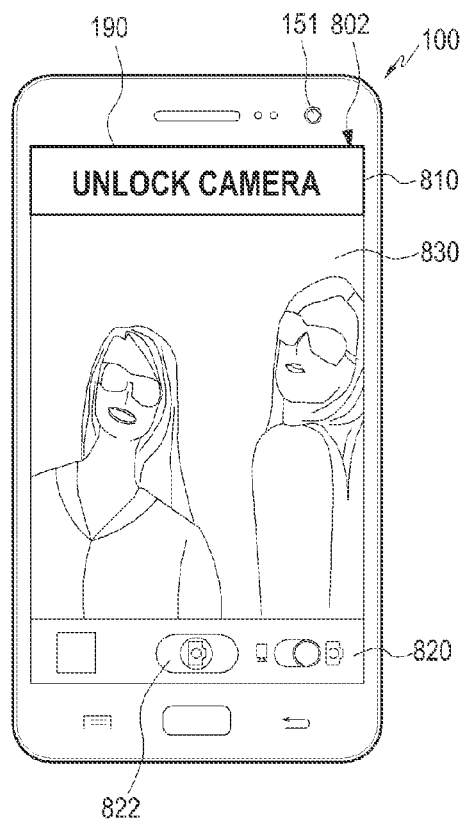

Referring to FIG. 20B, the controller 110 may partially unlock the lockout screen and execute a camera application, when a user is detected through the second camera 152. At this time, the camera application operates in a partial lockout mode, and the user may execute only a few functions of the camera application, but may not perform a change from a camera application screen 802 to another application screen or a change from the camera application screen 802 to a home screen. For example, the user may perform only photographing and may not view an image that is photographed and stored, in the camera application which is in the partial lockout mode.

A second menu bar 820 and a preview image 830 are displayed on a camera application screen 802. Further, an unlocking button 810 is displayed on the camera application screen 802, instead of a first menu bar 812 illustrated in FIG. 21A.

Figures 21A, 21B:
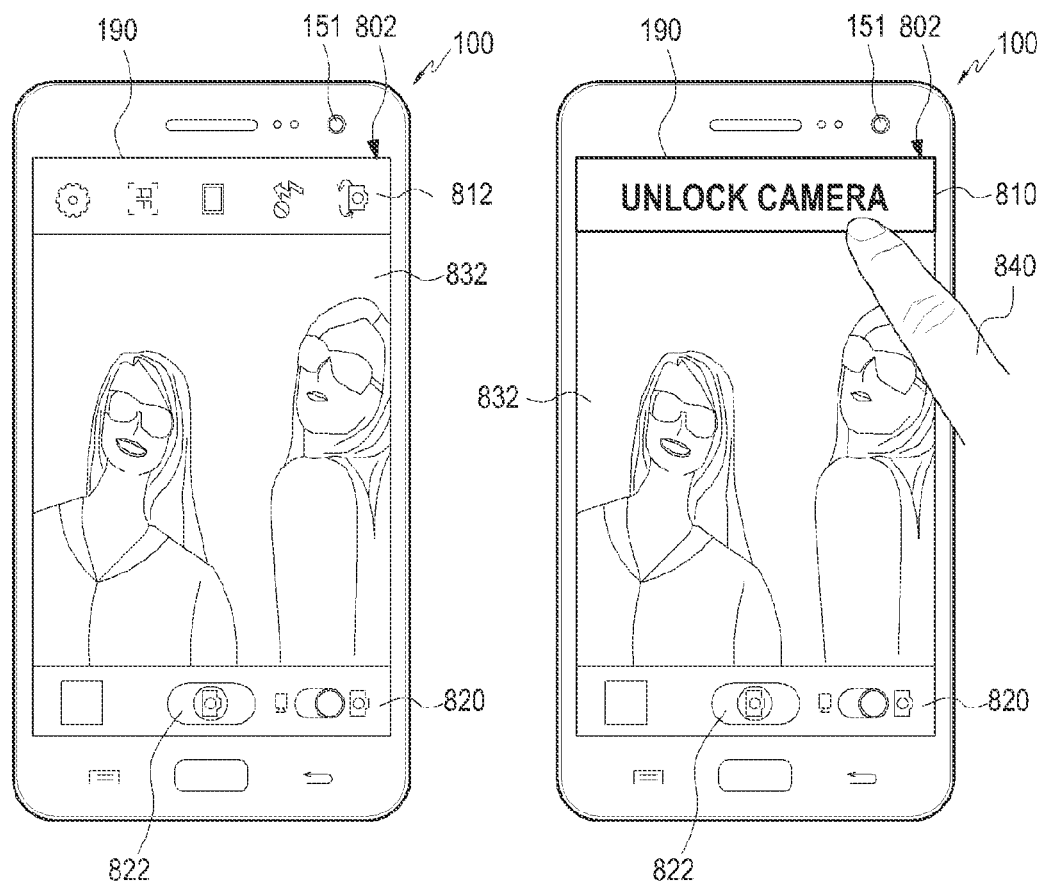

Referring to FIG. 21A, the controller 110 completely unlocks the camera application, and an image 832 that is photographed in the partial lockout mode is displayed, when a user is detected through the first camera 151.

Referring to FIG. 21B, the controller 110 completely unlocks the camera application, and an image 832 that is photographed in the partial lockout mode is displayed, when a user selects the unlocking button 810 with a finger 840.

FIGS. 22A to 22C illustrate examples of screen images displayed during an electronic device control method according to an embodiment of the present invention.

Referring to FIG. 22A, a lockout screen 900 is displayed on the touch screen 190 when a preset time passes without a user input.

The controller 110 activates the first and second cameras 151 and 152 and sets a timer having a preset time limit (namely, a critical value), when a user drags the lockout screen 900 in a preset direction using a finger 940.

The controller 110 determines whether or not a user is detected, through the first and second cameras 151 and 152 within the time limit of the timer.

Referring to FIG. 22B, the controller 110 deactivates the first camera 151 and displays a preview image that is photographed by the second camera 152, when a user is detected through the second camera 152 with the time limit of the timer. A first menu bar 910, a second menu bar 920 including a capture button 922, and the preview image 930 are displayed on a camera application screen 902.

Referring to FIG. 22C, the controller 110 deactivates the second camera 152 and displays a preview image 932 that is photographed by the first camera 151, when a user is detected through the first camera 151 within the time limit of the timer.

Although the touch screen has been described herein as a representative example of a display unit displaying a screen in the above-described embodiments, a general display unit without a touch detecting function, including a Liquid Crystal Display (LCD), an Organic Light Emitting Diode (OLED), and a Light Emitting Diode (LED), may be used as a display unit instead of the touch screen.

According to the above-described embodiments of the present invention, an electronic device including a front camera and a rear camera automatically performs a change of a user input interface, a change of a screen, interruption of a specific function of the electronic device, a count of a timer, an automatic change of a zoom level, a change of a preview image, interruption of a screen, a change of an activated camera, unlocking of a lockout screen, and displaying of a preview image through a camera detecting a user, which makes it possible for a user to more conveniently and safely use the camera based application.

It may be appreciated that the embodiments of the present invention can be implemented in software, hardware, or a combination thereof. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be also appreciated that the memory included in the mobile terminal is one example of machine-readable devices suitable for storing a program including instructions that are executed by a processor device to thereby implement embodiments of the present invention. Therefore, embodiments of the present invention provide a program including codes for implementing a system or method claimed in any claim of the accompanying claims and a machine-readable device for storing such a program. Moreover, such a program as described above can be electronically transferred through an arbitrary medium such as a communication signal transferred through cable or wireless connection, and the present invention properly includes the things equivalent to that.

Further, the device can receive the program from a program providing apparatus connected to the device wirelessly or through a wire and store the received program. The program providing apparatus may include a memory for storing a program containing instructions for allowing the camera apparatus to perform a preset content protecting method and information required for the content protecting method, a communication unit for performing wired or wireless communication with the camera apparatus, and a controller for transmitting the corresponding program to the camera apparatus according to a request of the camera apparatus or automatically.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. An electronic device comprising:
    a first camera;
    a second camera; and
    a controller configured to:
        detect, through the first camera, while the second camera is deactivated, a user registered in the electronic device;
        automatically activate the second camera based on the detecting of the registered user through the first camera;
        determine whether or not the registered user is detected through the second camera within a time limit;
        when determining that the registered user is detected through the second camera within the time limit, perform a preset function of the electronic device; and
        when determining that the registered user is not detected through the second camera within the time limit, automatically deactivate the second camera while the first camera is being activated.

2. The electronic device of claim 1, wherein the controller is further configured to set a timer having the time limit.

3. The electronic device of claim 2, wherein the timer starts when a rotation angle of the electronic device is greater than or equal to a preset angle.

4. The electronic device of claim 2, wherein the timer starts when the registered user is no longer detected through the first camera.

5. The electronic device of claim 1, further comprising a storage unit that stores an image photographed by the first camera or the second camera.

6. The electronic device of claim 1, wherein the preset function comprises a change of a user input interface.

7. The electronic device of claim 1, wherein the preset function comprises an interruption of a specific function of the electronic device.

8. The electronic device of claim 1, wherein the preset function comprises an interruption of a screen.

9. A method for controlling an electronic device including a first camera and a second camera, the method comprising:
    detecting, through the first camera, while the second camera is deactivated, a user registered in the electronic device;
    automatically activating the second camera based on the detecting of the registered user through the first camera;
    determining whether or not the registered user is detected through the second camera within a time limit;
    when determining that the registered user is detected through the second camera within the time limit, performing a preset function of the electronic device; and
    when determining that the registered user is not detected through the second camera within the time limit, automatically deactivating the second camera while the first camera is being activated.

10. The method of claim 9, further comprising setting a timer having the time limit.

11. The method of claim 10, wherein the timer starts when a rotation angle of the electronic device is greater than or equal to a preset angle.

12. The method of claim 10, wherein the timer starts when the user is no longer detected through the first camera.

13. The method of claim 9, wherein the preset function comprises at least one of:
    a change of a user input interface;
    an interruption of a specific function of the electronic device; and
    an interruption of a screen.

14. A non-transitory machine readable storage medium that stores a program for execution of a method for controlling an electronic device including a first camera and a second camera, the method comprising:
    detecting, through the first camera, while the second camera is deactivated, a user registered in the electronic device;
    automatically activating the second camera based on the detecting of the registered user through the first camera;
    determining whether or not the registered user is detected through the second camera within a time limit;
    when determining that the registered user is detected through the second camera within the time limit, performing a preset function of the electronic device; and
    when determining that the registered user is not detected through the second camera within the time limit, automatically deactivating the second camera while the first camera is being activated.

15. The non-transitory machine readable storage medium of claim 14, wherein the method further comprises setting a timer having the time limit.

16. The non-transitory machine readable storage medium of claim 15, wherein the timer starts when a rotation angle of the electronic device is greater than or equal to a preset angle.

17. The non-transitory machine readable storage medium of claim 15, wherein the timer starts when the registered user is no longer detected through the first camera.

18. The non-transitory machine readable storage medium of claim 14, wherein the preset function comprises at least one of:
    a change of a user input interface;
    an interruption of a specific function of the electronic device; and
    an interruption of a screen.

* * * * *